(12) United States Patent
    Mallena

(10) Patent No.: US 12,579,452 B2
(45) Date of Patent: Mar. 17, 2026

(54) EVALUATION SCORE DETERMINATION MACHINE LEARNING MODELS WITH DIFFERENTIAL PERIODIC TIERS

(71) Applicant: Optum, Inc., Minnetonka, MN (US)

(72) Inventor: Shyam Charan Mallena, Telangana (IN)

(73) Assignee: Optum, Inc., Minnetonka, MN (US)

( * ) Notice: Subject to any disclaimer, the term of this patent is extended or adjusted under 35 U.S.C. 154(b) by 917 days.

(21) Appl. No.: 17/659,028

(22) Filed: Apr. 13, 2022

(65) Prior Publication Data

US 2023/0281483 A1     Sep. 7, 2023

(30) Foreign Application Priority Data

Mar. 1, 2022    (IN) .............................. 202211011013

(51) Int. Cl.
    *G06N 5/04*        (2023.01)
    *G06N 5/02*        (2023.01)
(52) U.S. Cl.
    CPC ............... *G06N 5/04* (2013.01); *G06N 5/027* (2013.01)
(58) Field of Classification Search
    CPC ................................. G06N 5/04; G06N 5/027
    See application file for complete search history.

(56) References Cited

U.S. PATENT DOCUMENTS 9,336,268 B1 *   5/2016   Moudy ................... G06F 40/20
11,145,391 B1   10/2021   Mirica 2008/0300923 A1   12/2008   Theophilos
2011/0125531 A1    5/2011   Seare et al.
2011/0320225 A1   12/2011   Hulsey et al.
2013/0085769 A1    4/2013   Jost et al.
2015/0339446 A1   11/2015   Sperling et al.
2016/0092641 A1    3/2016   Delaney et al.
                (Continued)

FOREIGN PATENT DOCUMENTS

WO        2017/027718 A1     2/2017

OTHER PUBLICATIONS

Han, Y., Liu, Y., & Jin, Z. (Jan. 2019). Sentiment analysis via semi-supervised learning: a model based on dynamic threshold and multi-classifiers. Neural Computing and Applications, 32, 5117-5129. (Year: 2019).*

(Continued)

*Primary Examiner* — Michael J Huntley
*Assistant Examiner* — Maggie Thanh Maido
(74) *Attorney, Agent, or Firm* — Alston & Bird LLP

(57)            ABSTRACT

Various embodiments of the present invention address technical challenges associated with performing machine learning operations on timeseries/periodic data by introducing a machine learning framework that has a first periodic tier for determining predicted evaluation scores for those predictive entities that are associated with a single evaluation period (e.g., a single year of data) and a second periodic tier for determining predicted evaluation scores for those predictive entities that are associated with multiple evaluation periods. The noted framework addresses the existing shortcomings of machine learning frameworks that operate on timeseries/ periodic data with respect to inadequacy of data associated with shorter periods to determine parameters needed to perform comprehensive predictive data analysis with respect to longer periods.

17 Claims, 15 Drawing Sheets

(56)          References Cited

U.S. PATENT DOCUMENTS

| | | |
|---|---|---|
| 2016/0098520 A1 | 4/2016 | Lulias et al. |
| 2019/0244697 A1 | 8/2019 | Farrell |
| 2022/0036281 A1* | 2/2022 | Chekroud .............. G16H 40/20 |
| 2022/0188664 A1* | 6/2022 | Singh ..................... G16H 50/70 |

OTHER PUBLICATIONS

Shah, A. M., Yan, X., Qayyum, A., Naqvi, R. A., & Shah, S. J. (2021, February). Mining topic and sentiment dynamics in physician rating websites during the early wave of the COVID-19 pandemic: Machine learning approach. International Journal of Medical Informatics, 149, 104434. (Year: 2021).*

Black, Erik W. et al. "An Analysis Of Healthcare Providers' Online Ratings," Informatics In Primary Care, vol. 17, Dec. 2009, pp. 249-253.

Kulkarni, Saket S. et al. "Facial Expression (Mood) Recognition From Facial Images Using Committee Neural Networks," BioMedical Engineering Online, vol. 8, No. 16, Aug. 5, 2009, pp. 1-12, DOI: 10.1186/1475-925X-8-16, PMID: 19656402, PMCID: PMC2731770.

\* cited by examiner

100

Client Computing Entities 102

Optimized Engagement Prediction Computing Entity 106

Storage Subsystem 108

Optimized Engagement Prediction System 101

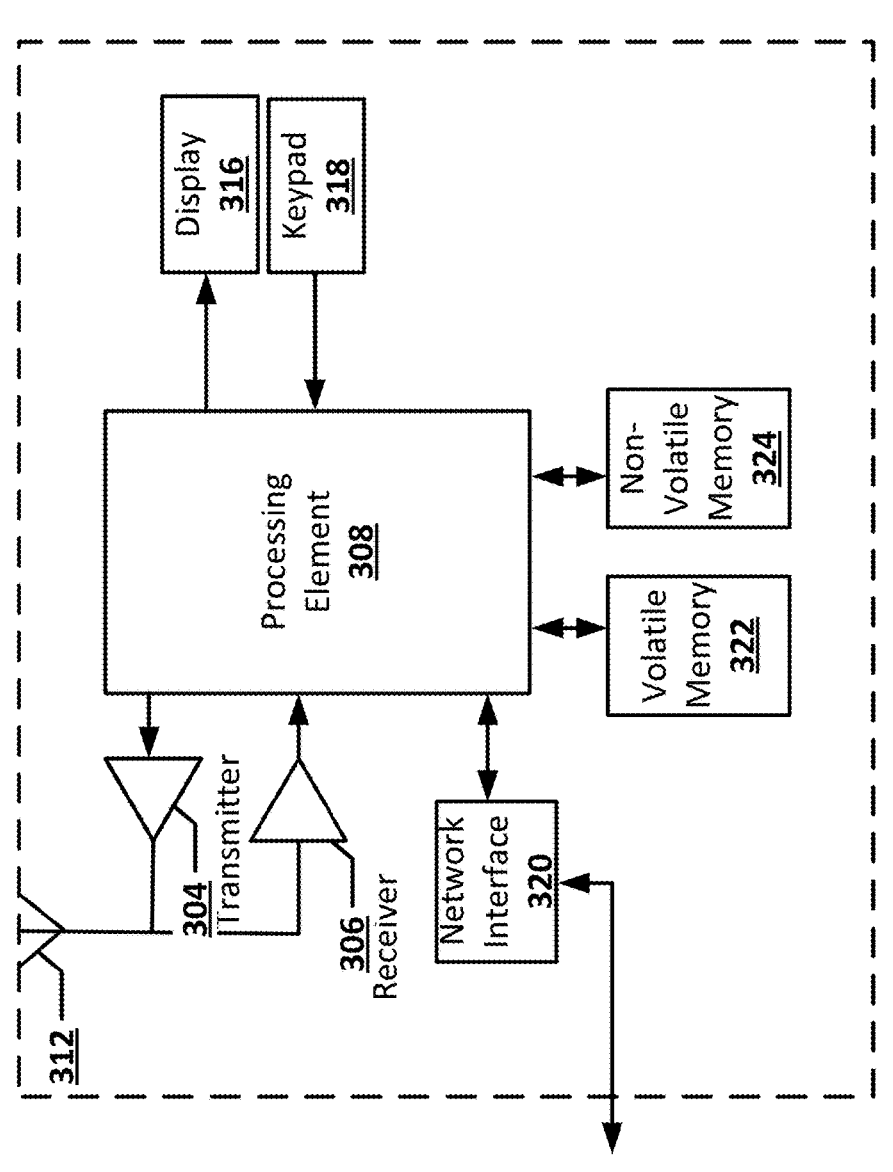
FIG. 3

400

Predictive Entity Data
Object
401

Optimized Engagement
Prediction System 101

First Engagement Determination Machine Learning Model Sub-Model
403

Cross-Platform
Evaluation Score
405

Second Engagement Determination Machine Learning Model Sub-Model
407

Entity Profile
Weightage Factor
409

Third Engagement Determination Machine Learning Model Sub-Model
411

Predicted Stable
Sentiment Score
413

FIG. 4

Predicted Evaluation
Score
415

600

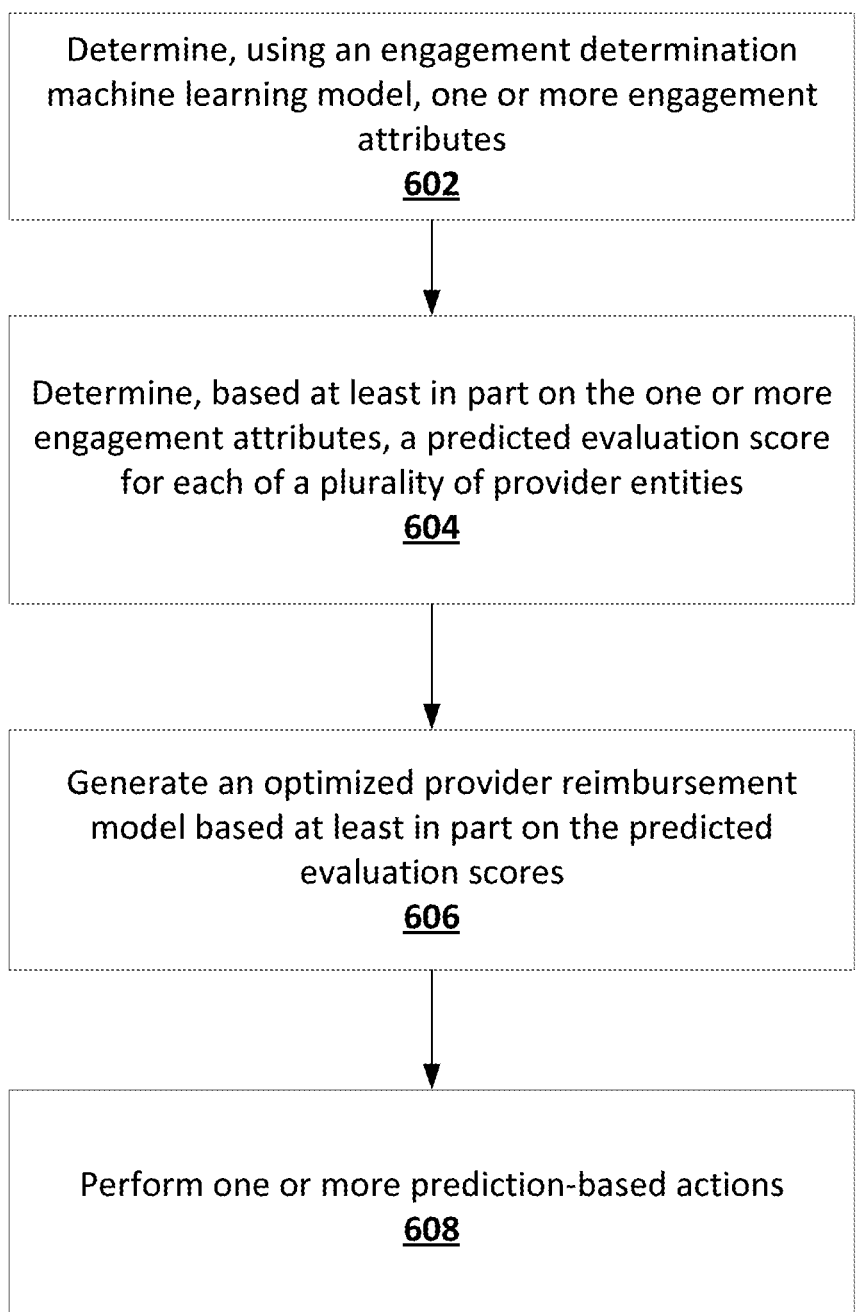

Determine, using an engagement determination machine learning model, one or more engagement attributes
602

Determine, based at least in part on the one or more engagement attributes, a predicted evaluation score for each of a plurality of provider entities
604

Generate an optimized provider reimbursement model based at least in part on the predicted evaluation scores
606

Perform one or more prediction-based actions
608

FIG. 6

700A

Retrospective Provider Demographics

Provider Clinical Profile    701A
*Attributes*
NPI ID
Provider Name
Provider School of Graduation
Provider Specialty
Provider State of Practice
More than One Specialty (Y/N)?

Provider Clinical Profile Historical    703A
*Attributes*
NPI ID
Provider Year
Participated Health Plan
Provider Practice state in that year
Associated to Organization (Y/N)
        If Y, Organization Name for that year Join by NPI ID

*Derived Attribute:*
Years of experience in each state
Associated number of Orgs / total
years of practice

Provider Personal Profile    705A
*Attributes*
NPI ID
Provider SSN
Provider Age
Provider Sex
Provider Race / Ethnic Origin Join by
NPI ID

Retrospective Provider
Demographics    707A
*Attributes*
NPI ID
Provider Name
Provider Specialty
Provider Years of experience
Provider School of Graduation
Provider State of Practice
More than One Specialty (Y/N)?
Years of experience in each state
Total years of Practice
Associated number of Orgs / total
years of practice
Provider SSN
Provider Age
Provider Sex
Provider Race / Ethnic Origin
Is Married?
Married since
No of Children?
Age of Children
EMR used (Y/N)
    If Y Percentage
Script Pre check use (Y/N)
    If Y Percentage

Provider Family Profile
*Attributes*    709A
Provider SSN
Is Married?
Married since
No of Children?
Age of Children Join by
SSN

*Assumption*
Provider is also a member in one
health plan or the other and exist in
our database as a Member

Member Profile    711A
*Attributes*
Member HIC
Member SSN
Plan/Client per Period
Is Married?
No of Children/Dependents?
Age of Children Join by
SSN

Provider Professional
Profile    713A
*Attributes*
NPI ID
EMR used (Y/N)
    If Y Percentage
Script Pre check use (Y/N)
    If Y Percentage Join by
NPI ID

*Derived Attributes from*
*EMR and PCMS data*

FIG. 7A

700B

Provider Reimbursement Demographics

Provider Services          701B
Attributes
NPI ID
Provider Name
Provider Organization
Claim ID
Date Of Service (DOS)

Claims Data Historical          703B
Attributes
Claim ID
DOS Year
Previous Claims by member in that year
Health Plan Reimbursement type
Is Fee for Service (Y/N)
        If Y, Claim Submitted date

705B

Provider Payer Call Data - Voice
Attributes
NPI ID
Claim ID
Call duration
Repeated call Y/N
If Y number of calls
Person who made the call Join by Claim ID

Claims Settlement
Attributes          707B
Claim ID
Claim Received date
Claim Settlement date
Total number of queries
Max Query Age
Average Query Age
Query Resolution
Provider Compensation Received date Join by Claim ID

Claim Reimbursement lag
Attributes          709B
NPI ID
Provider Name
Provider Organization
Claim ID
Date Of Service (DOS)
DOS Year
Previous Claims by member in that year
Health Plan Reimbursement type
Is Fee for Service (Y/N)
        If Y, Claim Submitted date
Claim Received date
Claim Settlement date
Total number of queries
Max Query Age
Average Query Age
Query Resolution
Provider Compensation Received date
Call duration
Repeated call Y/N
        If Y number of calls
Person who made the call Join by Claim ID          Derived Attribute: Query Ageing by ID

Claims Verification
Attributes          711B
Claim ID
Query ID
Query Open date
Query closed date
Query Resolution Join by Member ID

Member Health Plan
Attributes          713B
Member ID
Member eligibility
Co Pay, Compulsory deductible paid as per plan

Claims Settlement Percentage and Denial
Attributes          715B
NPI ID
Provider Name
Provider Organization
Claim ID
Date Of Service (DOS)
DOS Year
Previous Claims by member in that year
Health Plan Reimbursement type
Claimed Amount ($)
Reimbursed Amount ($)
Percentage reimbursed
Percentage of Denial

FIG. 7B

700C

Socially Enriched Provider Demographics

Provider Basic Social Profile    701C
*Attributes*
NPI ID
Provider Name
Internal Provider ID
Provider Cell #
Personal mail id
    Used in Twitter (Y/N)
      If N kindly provide
    Used in Facebook (Y/N)
      If N kindly provide
    Used in Linkedin (Y/N)
       If N kindly provide

Provider Mobile Demographics    703C
*Attributes*

*Refer table for Provider Mobile Demographics*

Derived Attribute:
Provider GPS/Location Coordinates
Voice Assistant Data
Facial images dump Join by Internal Provider ID

Provider Open Social Profile
*Attributes*    705C
Internal Provider ID
Twitter Data JSON
Web Scrap JSON Join by
Internal Provider ID

Twitter Data
(Twitter API - Tweepy) 709C
*Attributes*
Registered e-mail id
Twitter ID
Twitter Data JSON Join by email ID/Cell Number Join by email ID/ Cell Number

Socially Enriched Provider Demographics    707C
*Attributes*
NPI ID
Provider Name
Internal Provider ID
Provider Cell #
Provider Social Login ID
    Twitter
    Facebook
    Linkedin
Provider Mobile ID
Twitter Data JSON
Web Scrap JSON
Provider GPS JSON
Provider Voice JSON
Provider facial images dump

Provider Social JSON   711C
*Attributes*
Internal Provider ID
Registered email/Cell
Login ID
Web Scrap JSON Un-Structured to JSON
(Preprocessing and cleaning)

Web Scrapping Social Data
*Attributes*    713C
Web
URL(Facebook/Linkedin,etc)
Login ID
Unstructured data scrap

FIG. 7C

700D

Provider Mobile Demographics

Provider Mobile Device　701D
Internal Provider ID
NPI ID
Provider Name
Provider Mobile type
If Android (Y/N) Provide Android ID
If Apple (Y/N) Provide Apple ID

Provider Android Assistant　703D
*Attributes*
Internal Provider ID
Provider Name
Android Login ID
Device ID

Provider Android *Functionality (to collect Mobile Demographics)*
Voice based Assistant
Appointment scheduler
Calendar Synchronization
Maps Integration
Login /unlock via
Facial Recognition
Retrieve social profile IDs
　　Facebook ID
　　Twitter ID
　　Linkedin ID

*Derived Attribute:*
Provider GPS/Location Coordinates
Voice Assistant Data
Facial Expression Pattern data
Re confirm Facebook/twitter/Linkedin IDs Join by Internal Provider ID

Provider Mobile Demographics　705D
*Attributes*
Internal Provider ID
NPI ID
Provider Name
Provider Mobile type
If Android (Y/N) Provide Android ID
If Apple (Y/N) Provide Apple ID
Device ID
Provider GPS/Location Coordinates
Voice Assistant Data
Facial Expression Pattern data
Facebook ID
Twitter ID
Linkedin ID

Provider IOS /Apple Assistant　707D
*Attributes*
Internal Provider ID
Provider Name
Apple ID
Device ID

Provider IOS *Functionality (to collect Mobile Demographics)*
Voice based Assistant
Appointment scheduler
Calendar Synchronization
Maps Integration
Login /unlock via
Facial Recognition
Retrieve social profile IDs
　　Facebook ID
　　Twitter ID
　　Linkedin ID

Exploratory Data Analytics

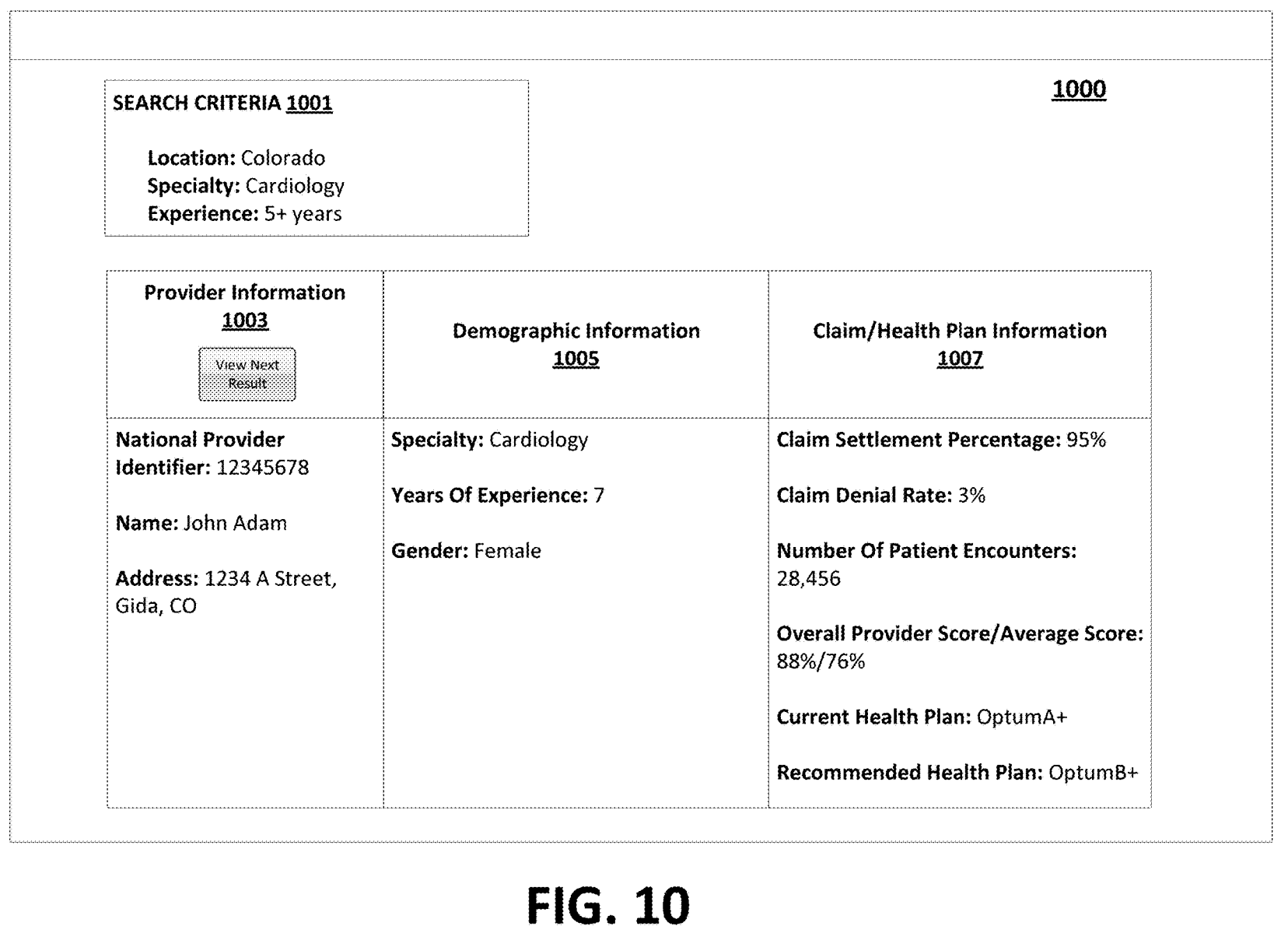

1000

SEARCH CRITERIA 1001

Location: Colorado
Specialty: Cardiology
Experience: 5+ years

Provider Information
1003

[View Next Result]

National Provider
Identifier: 12345678

Name: John Adam

Address: 1234 A Street,
Gida, CO

Demographic Information
1005

Specialty: Cardiology

Years Of Experience: 7

Gender: Female

Claim/Health Plan Information
1007

Claim Settlement Percentage: 95%

Claim Denial Rate: 3%

Number Of Patient Encounters:
28,456

Overall Provider Score/Average Score:
88%/76%

Current Health Plan: OptumA+

Recommended Health Plan: OptumB+

FIG. 10

EVALUATION SCORE DETERMINATION MACHINE LEARNING MODELS WITH DIFFERENTIAL PERIODIC TIERS

CROSS-REFERENCE TO RELATED APPLICATIONS

This application claims priority to Indian Patent Application No. 202211011013, filed Mar. 1, 2022, the contents of which are hereby incorporated herein in its entirety by reference.

BACKGROUND

Various embodiments of the present invention address technical challenges related to optimized engagement prediction systems and disclose innovative techniques, such as an engagement determination machine learning model, for improving efficiency and reliability of these systems.

BRIEF SUMMARY

Various embodiments of the present invention address technical challenges associated with performing machine learning operations on timeseries/periodic data by introducing a machine learning framework that has a first periodic tier for determining predicted evaluation scores for those predictive entities that are associated with a single evaluation period (e.g., a single year of data) and a second periodic tier for determining predicted evaluation scores for those predictive entities that are associated with multiple evaluation periods. The noted framework addresses the existing shortcomings of machine learning frameworks that operate on timeseries/periodic data with respect to inadequacy of data associated with shorter periods to determine parameters needed to perform comprehensive predictive data analysis with respect to longer periods.

In accordance with one aspect, a computer-implemented method for generating a predicted evaluation score for a predictive entity is provided. In one embodiment, the computer-implemented method comprises: generating, using an engagement determination machine learning model, and based at least in part on aggregated predictive entity data associated with the predictive entity, one or more engagement attributes for the predictive entity; determining whether the predictive entity is associated with a single evaluation period or a plurality of evaluation periods; in response to determining that the predictive entity is associated with the plurality of evaluation periods: for each evaluation platform of one or more evaluation periods, determine, based at least in part on the one or more engagement attributes, a per-platform evaluation score for the predictive entity with respect to the evaluation platform; determining a cross-platform evaluation deviation measure for the predictive entity based at least in part on each per-platform evaluation score; determining a cross-platform deviation penalty based at least in part on whether the cross-platform evaluation deviation measure satisfies a cross-platform deviation threshold; determining, based at least in part on the one or more evaluation parameters for the predictive entity, predicted evaluation score, wherein the one or more evaluation parameters comprise: (i) a cross-platform evaluation score, and (ii) the cross-platform deviation penalty; and determining the predicted evaluation score based at least in part on the one or more evaluation parameters; and performing one or more prediction-based actions based at least in part on the predicted evaluation score.

In accordance with another aspect, an apparatus for generating a predicted evaluation score for a predictive entity is provided, the apparatus comprising at least one processor and at least one memory including program code, the at least one memory and the program code configured to, with the processor, cause the apparatus to at least: generate, using an engagement determination machine learning model, and based at least in part on aggregated predictive entity data associated with the predictive entity, one or more engagement attributes for the predictive entity; determine whether the predictive entity is associated with a single evaluation period or a plurality of evaluation periods; in response to determining that the predictive entity is associated with the plurality of evaluation periods: for each evaluation platform of one or more evaluation periods, determine, based at least in part on the one or more engagement attributes, a per-platform evaluation score for the predictive entity with respect to the evaluation platform; determine a cross-platform evaluation deviation measure for the predictive entity based at least in part on each per-platform evaluation score; determine a cross-platform deviation penalty based at least in part on whether the cross-platform evaluation deviation measure satisfies a cross-platform deviation threshold; determine, based at least in part on the one or more evaluation parameters for the predictive entity, predicted evaluation score, wherein the one or more evaluation parameters comprise: (i) a cross-platform evaluation score, and (ii) the cross-platform deviation penalty; and determine the predicted evaluation score based at least in part on the one or more evaluation parameters; and perform one or more prediction-based actions based at least in part on the predicted evaluation score.

In accordance with yet another aspect, a computer program product for generating a predicted evaluation score for a predictive entity is provided, the computer program product comprising at least one non-transitory computer-readable storage medium having computer-readable program code portions stored therein, the computer-readable program code portions configured to: generate, using an engagement determination machine learning model, and based at least in part on aggregated predictive entity data associated with the predictive entity, one or more engagement attributes for the predictive entity; determine whether the predictive entity is associated with a single evaluation period or a plurality of evaluation periods; in response to determining that the predictive entity is associated with the plurality of evaluation periods: for each evaluation platform of one or more evaluation periods, determine, based at least in part on the one or more engagement attributes, a per-platform evaluation score for the predictive entity with respect to the evaluation platform; determine a cross-platform evaluation deviation measure for the predictive entity based at least in part on each per-platform evaluation score; determine a cross-platform deviation penalty based at least in part on whether the cross-platform evaluation deviation measure satisfies a cross-platform deviation threshold; determine, based at least in part on the one or more evaluation parameters for the predictive entity, predicted evaluation score, wherein the one or more evaluation parameters comprise: (i) a cross-platform evaluation score, and (ii) the cross-platform deviation penalty; and determine the predicted evaluation score based at least in part on the one or more evaluation parameters; and perform one or more prediction-based actions based at least in part on the predicted evaluation score.

BRIEF DESCRIPTION OF THE DRAWINGS

Figure 1:

Having thus described the invention in general terms, reference will now be made to the accompanying drawings, which are not necessarily drawn to scale, and wherein:

FIG. 1 provides an exemplary overview of a system architecture that can be used to practice embodiments of the present invention.

Figure 2:
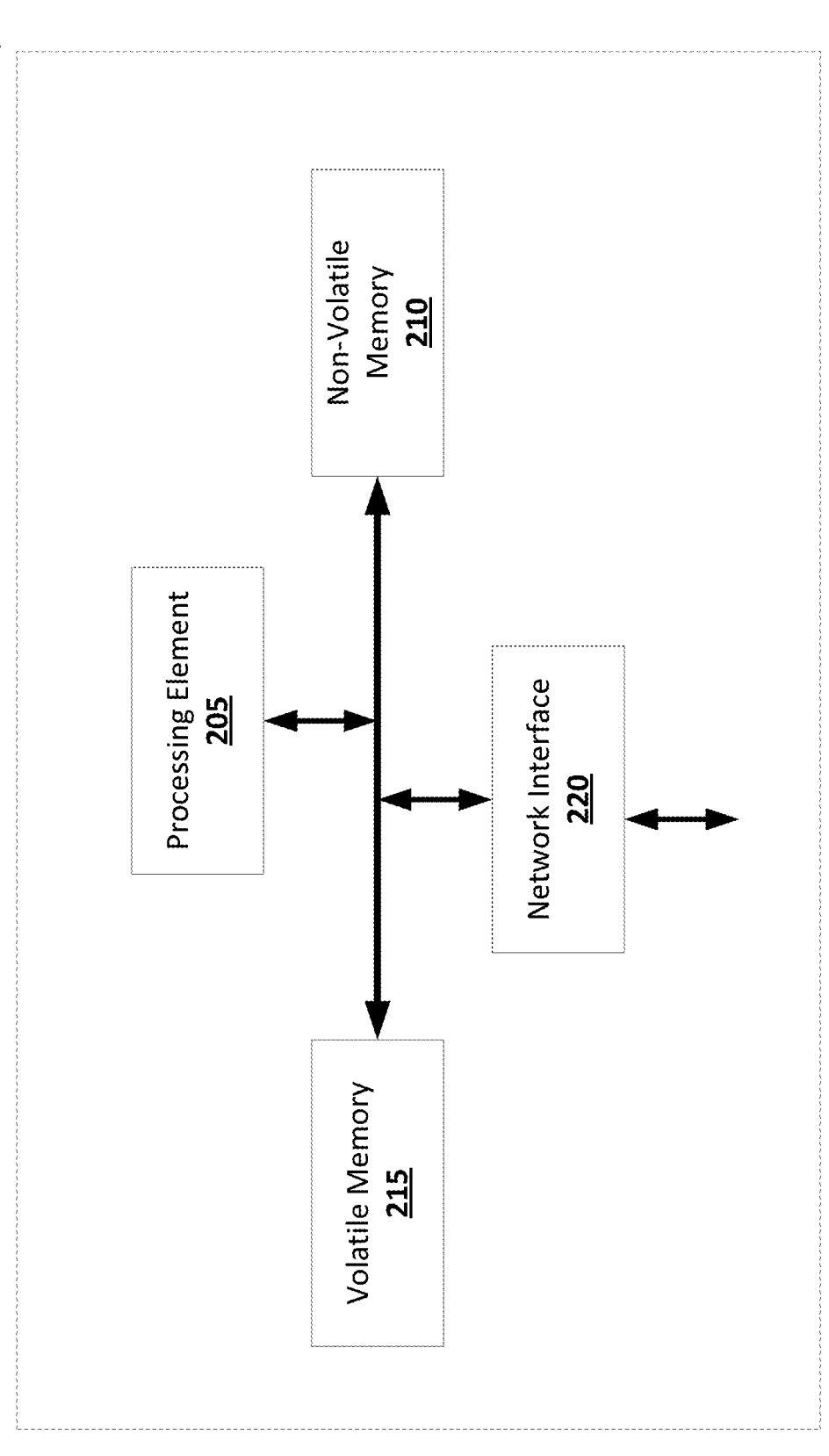

FIG. 2 provides an example optimized engagement prediction computing entity in accordance with some embodiments discussed herein.

FIG. 3 provides an example client computing entity in accordance with some embodiments discussed herein.

FIG. 4 provides an exemplary schematic of a system architecture for generating a predicted evaluation score in accordance with some embodiments discussed herein.

Figure 5:
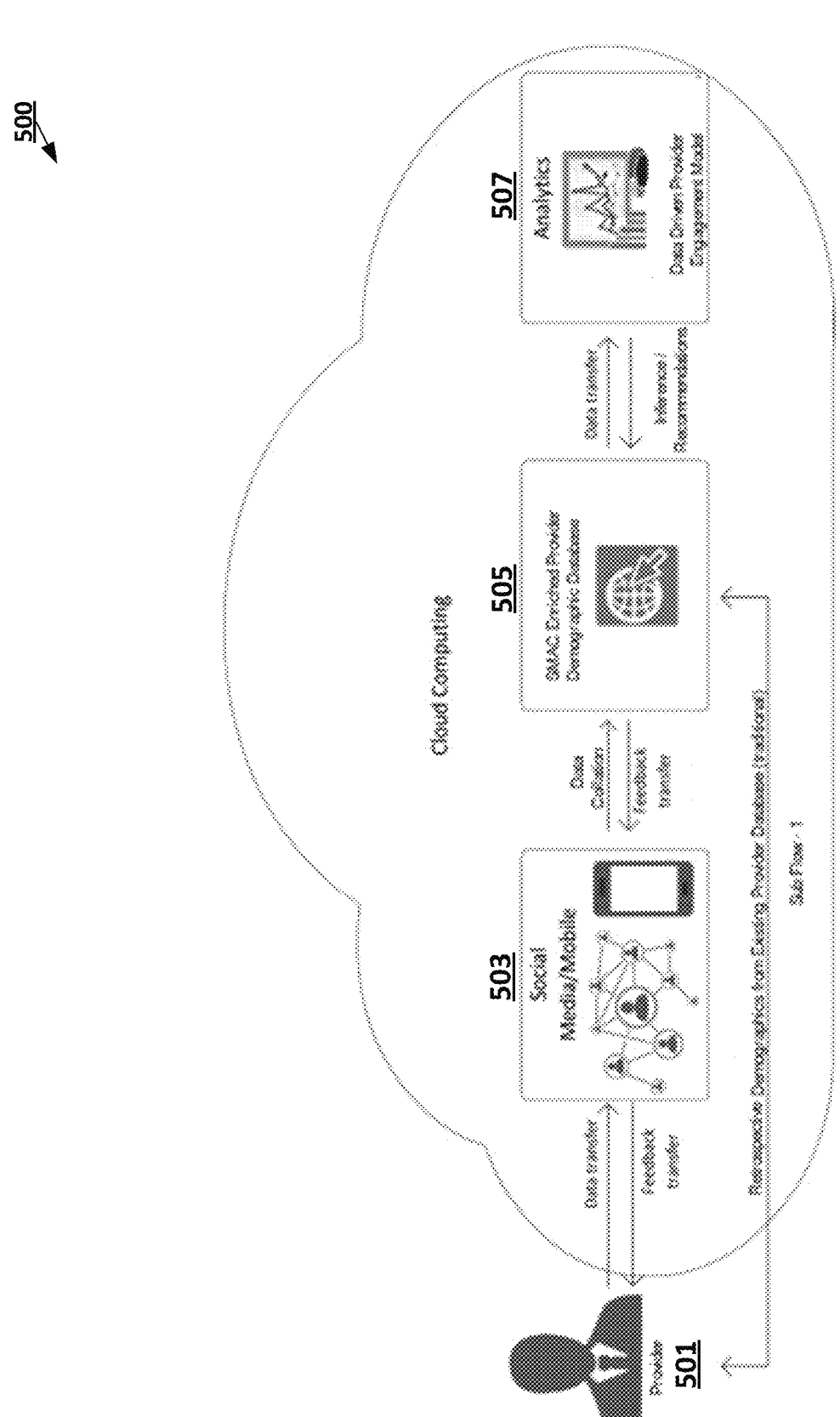

FIG. 5 provides an operational example depicting an example process for generating a predictive entity data object/a provider demographic database in accordance with some embodiments of the present invention.

FIG. 6 provides a flowchart diagram illustrating an example process that leads to performing one or more prediction-based actions in accordance with some embodiments discussed herein.

FIGS. 7A-FIG. 7E provide operational examples in accordance with some embodiments discussed herein.

Figure 8:
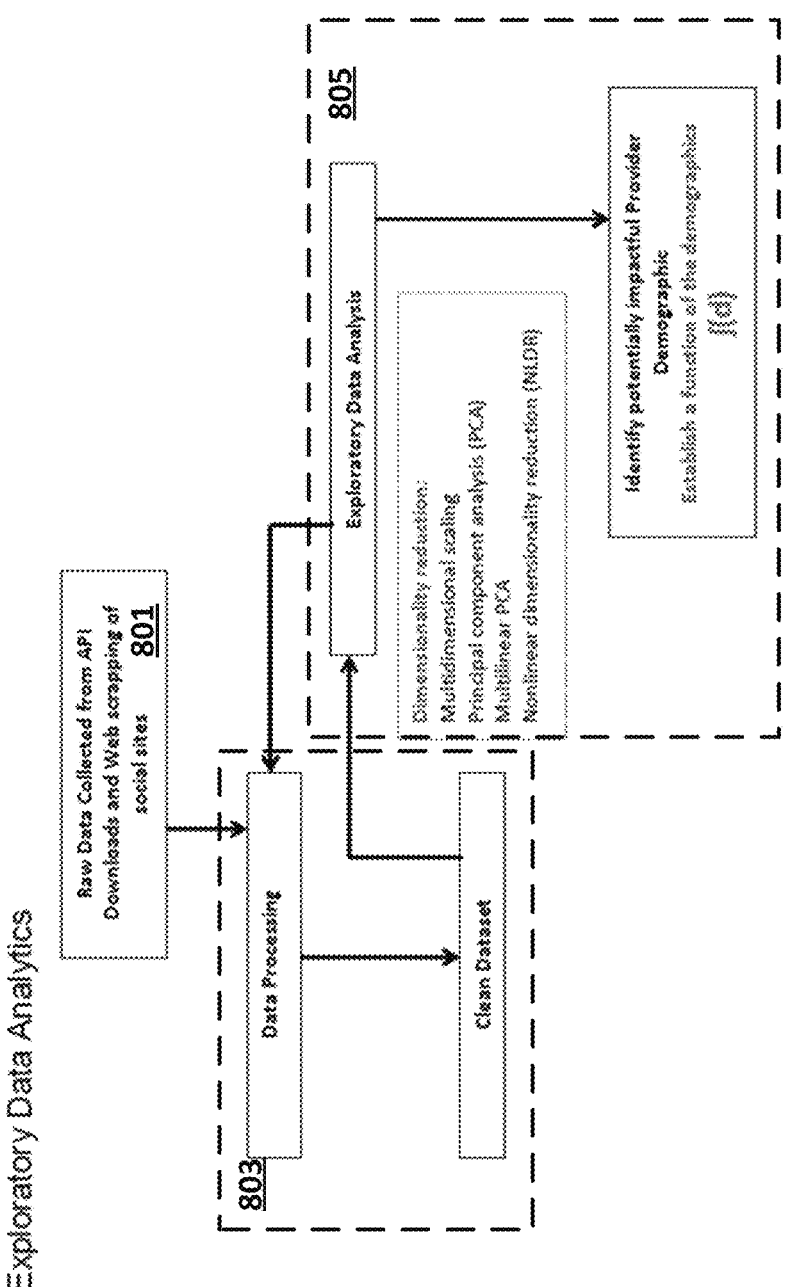

FIG. 8 provides a flowchart diagram illustrating an example process for performing exploratory data analytics steps/operations in accordance with some embodiments discussed herein.

Figure 9A:
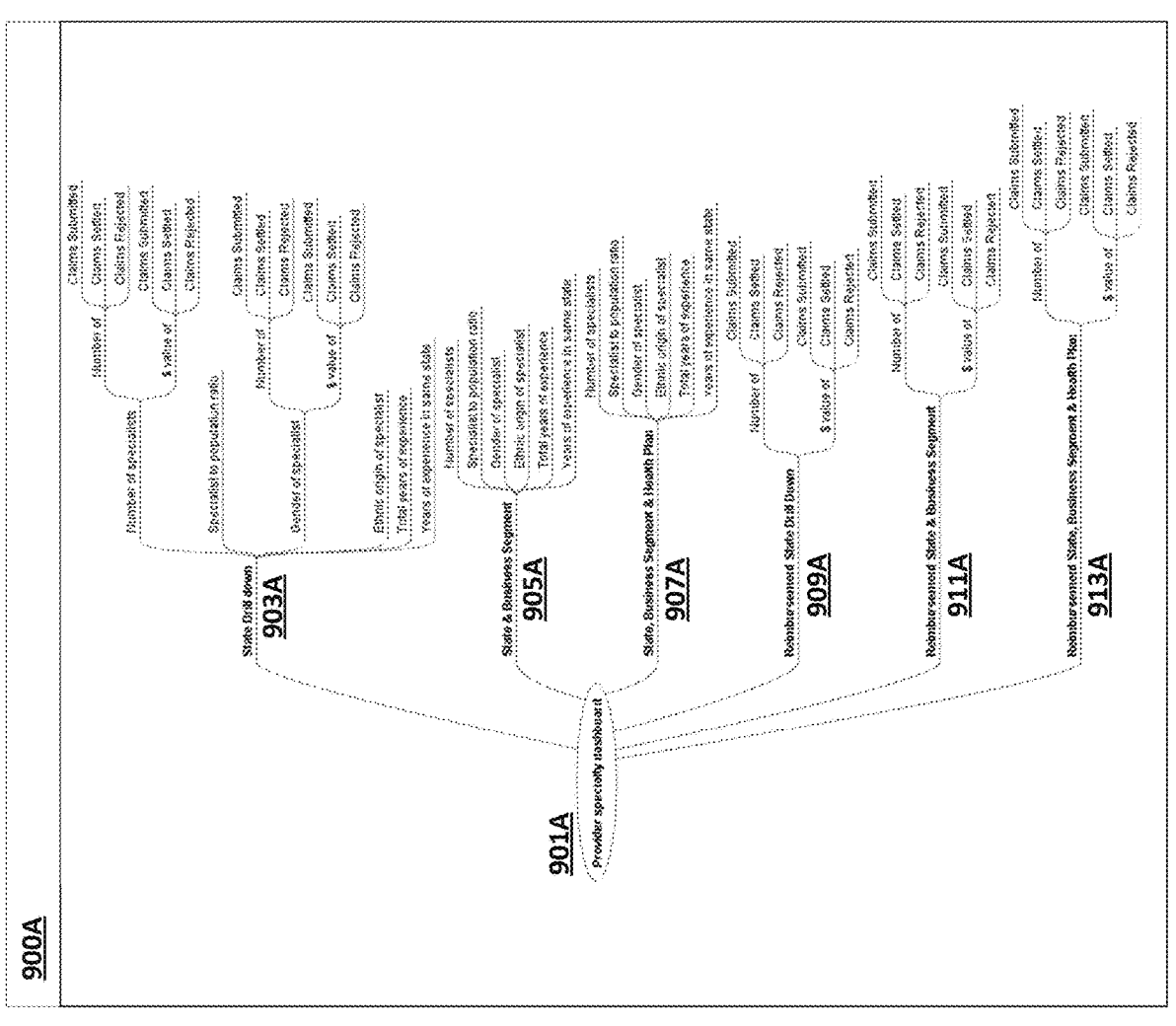
Figure 9B:
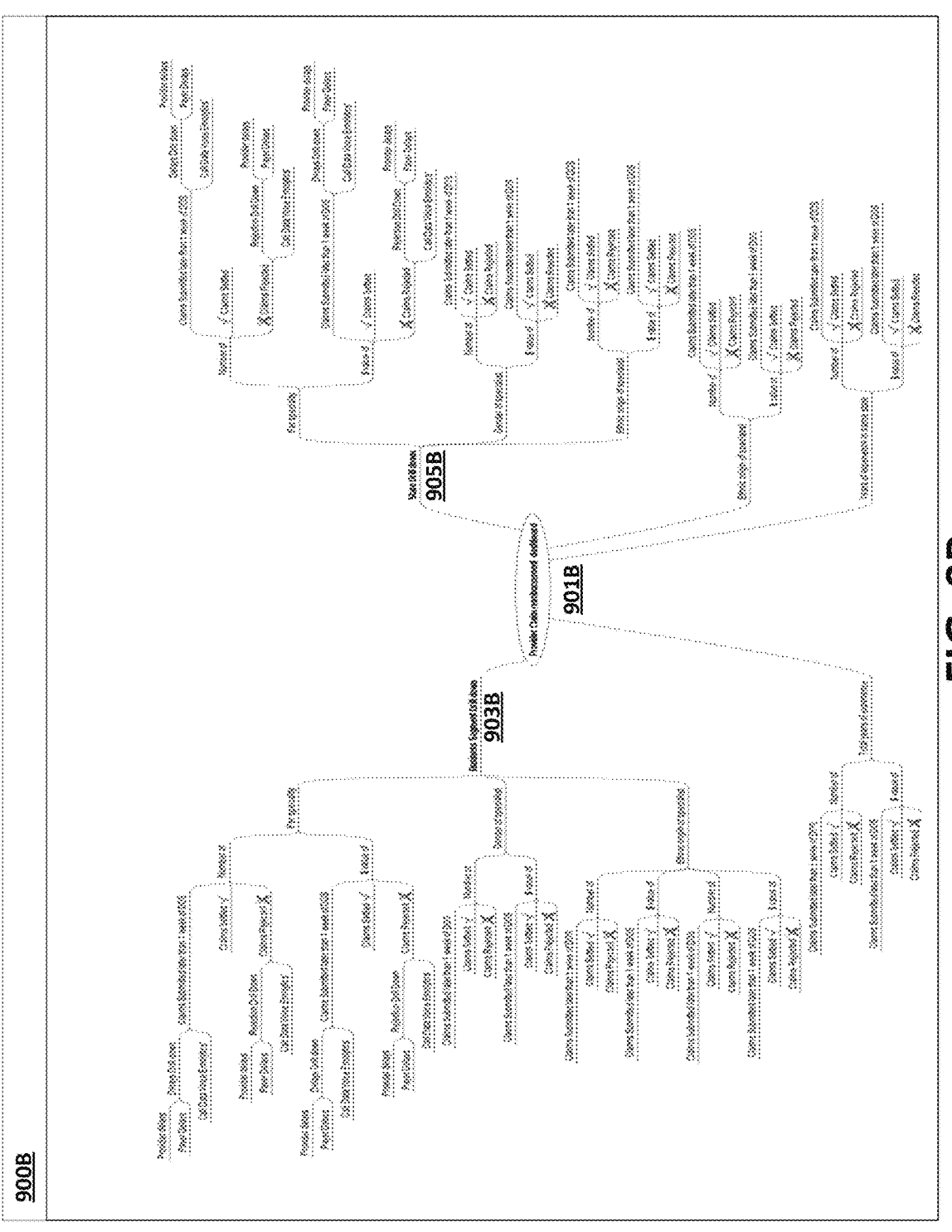

FIGS. 9A-9B provide operational examples of prediction output user interfaces in accordance with some embodiments discussed herein.

FIG. 10 provides another operational example of a prediction output user interface in accordance with some embodiments discussed herein.

DETAILED DESCRIPTION

Various embodiments of the present invention are described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview and Technological Advantages

Various embodiments of the present invention address technical challenges associated with performing machine learning operations on timeseries/periodic data by introducing a machine learning framework that has a first periodic tier for determining predicted evaluation scores for those predictive entities that are associated with a single evaluation period (e.g., a single year of data) and a second periodic tier for determining predicted evaluation scores for those predictive entities that are associated with multiple evaluation periods. The noted framework addresses the existing shortcomings of machine learning frameworks that operate on timeseries/periodic data with respect to inadequacy of data associated with shorter periods to determine parameters needed to perform comprehensive predictive data analysis with respect to longer periods. In accordance with techniques described herein, predictive entities that are associated with a single evaluation period are isolated and processed using a computationally efficient linear regression model, while predictive entities associated with multiple evaluation periods are subject to a more complex processing performed using a set of evaluation parameters. In this way, the machine learning framework that utilizes periodic tiers is able to more efficiently and effectively perform machine learning operations on timeseries/periodic data by introducing a machine learning framework that has a first periodic tier for determining predicted evaluation scores for those predictive entities that are associated with a single evaluation period (e.g., a single year of data) and a second periodic tier for determining predicted evaluation scores for those predictive entities that are associated with multiple evaluation periods.

Existing provider-related database systems lack sophistication and are not optimized in view of available data, thereby devaluing any predictive outputs that can be generated by such systems. By way of example, known predictive entity database systems are not configured to optimize for different predictive entities based at least in part on identified engagement attributes. By way of example, provider reimbursement rates for rendered services are generally fixed/static and are determined depending on service information (e.g., service type) and do not account for engagement attributes associated with various provider entities. In some examples, existing systems may assess historical treatment patterns in order to generate a payment schedule without considering or integrating provider-specific information/data.

In one example, payment for cataract eye surgery may be strictly contingent on treatment codes and paid irrespective of the complexity of the surgery, and the experience level or the surgeon. In some examples, a practitioner may request additional reimbursement but such processes may be time consuming and prove unsuccessful. Thus, a senior/well-established surgeon may be disincentivized to participate in a provider program (e.g., provider health plan) under which they will receive the same reimbursement as less experienced surgeons. In some examples, this can lead to poor outcomes for service recipients/patients. By way of example, an oncologist may determine, based upon years of clinical experience, that a lower dosage of a standard drug (e.g., 7 ml of a chemotherapy drug instead of 10 ml of the chemotherapy drug) is sufficient for a particular patient and will result in fewer side effects and a lower risk of hospitalization. However, there may be no available reimbursement option for the lower dosage of the drug under an agreed reimbursement plan. Accordingly, the oncologist may choose to administer the standard dosage of the drug, or choose to forego enrolling in a provider health plan, in order to avoid the additional burden and payment delays associated with administering the lower dosage of the drug. This may lead to more side effects and even result in extended hospitalization for a patient. Additionally, frequency of such circumstances may lead highly experienced and effective providers to avoid participating in certain provider health plans. In another example, a particular oncologist practicing in an isolated location may be unaware of the latest developments in chemotherapy regimens and may inadvertently use an outdated higher dosage of a drug to treat a patient, which may also result in avoidable side effects and hospitalization.

Accordingly, existing systems do not account for or reward highly skilled/reputable providers which may discourage participation in provider health plans and/or skew the pool of available providers to younger and less experienced individuals, which may lead to an overall increase in healthcare costs. Additionally, existing systems are not suitable for assessing a provider's practice/decision making in order to provide information that can be used to improve recipient/patient outcomes.

In order to reduce overall healthcare delivery costs and provide value-based care across different jurisdictions effectively, and in relation to specific diseases, more provider engagement and attendant analysis is required. For example, proper analysis of provider demographic data may facilitate identification of locations where a ratio of available providers to the recipient population is low. For example, candidate providers in particular locations can be approached or encouraged to become participating providers in provider health plans in order to reduce healthcare costs.

There is a need for improved systems and methods configured to perform optimized engagement predictive steps/operations that are suitable for aptly reimbursing providers in view of their experience and skill while reducing healthcare delivery costs. Accordingly, various embodiments of the disclosed techniques improve accuracy and reliability of optimized engagement prediction systems and predictive data analysis relative to various state-of-the-art solutions.

II. Definitions of Certain Terms

The term "predictive entity data object" may refer to a data object storing and/or providing access to information/data with respect to a predictive entity, such as, but not limited to, a provider entity. In some embodiments, the predictive entity data object may comprise audio data, documents (e.g., transcripts), image/video sensor data (e.g., one or more recorded events), engagement platform data (e.g., social media data, mobile platform data, combinations thereof, and/or the like, also referred to as social, mobile, analytics, and cloud (SMAC) data). In some embodiments, an optimized engagement prediction system may generate (e.g., obtain, capture, store, and/or the like) a predictive entity data object describing data/information associated with a predictive entity. By way of example, an optimized engagement prediction system may generate provider clinical profile information, historical clinical profile information, provider personal profile information, and/or provider family profile information associated with a provider entity. In some embodiments, the optimized engagement prediction system may store one or more predictive entity data objects in a database (e.g., a database (e.g., retrospective predictive entity profile database)). In some embodiments, each predictive entity data object may comprise entity profile data that is generated based at least in part on structured and/or unstructured data obtained from a plurality of sources (e.g., mobile devices, engagement platforms, healthcare management systems, and/or the like). In some embodiments, historical clinical profile information may comprise provider compensation information, claim information (e.g., date of service, claim settlement lag information, claim settlement percentage, claim denial rates, percentage of approved claim amounts), provider audio data (e.g., describing one or more recorded interactions between a provider entity and a recipient entity), and/or the like. In some embodiments, provider clinical profile information may comprise provider demographic information (e.g., age, gender, ethnicity, year of graduation, specialty, current and historical location information, duration of practice, and/or the like). Feature data described by a provider entity data object are in some embodiments referred to engagement attributes for the corresponding provider entity.

The term "optimized provider reimbursement model" may refer to a data object that describes a predictive output of one or more computer-implemented processes, wherein the predictive output describes one or more predictive inferences relating to an optimized compensation structure or formula for a plurality of provider entities.

The term "engagement determination machine learning model" may refer to a data object that describes steps/operations, hyper-parameters, and/or parameters of a machine learning model that is configured to determine one or more engagement attributes for the predictive entity and/or a predicted evaluation score with respect to a predictive entity. The steps/operations of the engagement determination machine learning model may be used to performing one or more prediction-based actions. In some embodiments, the engagement determination machine learning model may be configured to determine the predicted evaluation score based at least in part on a cross-platform evaluation score, an entity profile weightage factor, and/or a stable sentiment score. In some embodiments, the engagement determination machine learning model may comprise a first sub-model that is configured to determine the cross-platform evaluation score. Additionally, the engagement determination machine learning model may comprise a second sub-model that is configured to determine an entity profile weightage factor. In some embodiments, the engagement determination machine learning model may comprise a third sub-model that is configured to determine the predicted sentiment score. An example of an engagement determination machine learning model is a convolutional deep neural network machine learning model, a convolutional neural network model, a recurrent neural network (RNN), and/or the like.

The term "predicted evaluation score" may refer to a data object that describes a predictive output of one or more computer-implemented processes, wherein the predictive output is a value describing an inferred determination relating to engagement effectiveness of a predictive entity with respect to other entities (e.g., recipient entities, family, friends, and/or the like). In some embodiments, the predicted evaluation score may be an output of an engagement determination machine learning model. Additionally, in some embodiments, determining the predicted evaluation score may comprise determining a cross-platform evaluation score, an entity profile weightage factor, a stable engagement score, and/or a stable sentiment score, and determining the predicted evaluation score based at least in part on the cross-platform evaluation score, the entity profile weightage factor, and/or a stable sentiment score. In some examples, the predicted evaluation score may be a value (e.g., a percentage value or a number between 0 and 1), where an above-threshold value indicates that the predictive entity is likely to have high-quality/effective interactions with other entities (e.g., recipient entities). In some embodiments, an example predicted evaluation score may be determined based at least in part on the following equation:

$$P = (S*M) + 0.1n - U + B + D$$

In the above equation:
P is a predicted evaluation score;
S is a cross-platform evaluation score;
M is a cross-platform deviation penalty;
n is an evaluation period count;
U is an unstable engagement penalty;
B is a stable engagement score; and
D is an entity profile weightage factor.

The term "cross-platform evaluation score" may refer to a data object that describes a predicted score for a predictive entity that is determined by aggregating the per-platform evaluation scores for the predictive entity across n evaluation platforms and across m periods (e.g., across 3 evaluation periods and across 3 years). For example, the cross-platform evaluation score for a particular medical provider entity may be determined by averaging the per-platform evaluation score for the medical provider entity with respect to the Facebook platform across a current year, the per-platform evaluation score for the medical provider entity with respect to the Google platform across the current year, the per-platform evaluation score for the medical provider entity with respect to the Facebook platform across the preceding year, and the per-platform evaluation score for the medical provider entity with respect to the Google platform across the preceding year. In some embodiments, the cross-platform evaluation score describes an inferred optimal value/prospective value for modifying (e.g., increasing or decreasing) a predicted evaluation score. The cross-platform evaluation score may be a predictive output of a sub-model of an engagement determination machine learning model. In some embodiments, a cross-platform evaluation score may be associated with recipient reviews and/or engagement platform reviews (e.g., associated with a plurality of social media engagement platforms). In some embodiments, the cross-platform evaluation score may be determined based at least in part on one or more per-platform evaluation scores that are each associated with an evaluation platform. In some embodiments, the cross-platform evaluation score may be used to determine one or more evaluation parameters.

The term "evaluation parameter" may refer to a data object that describes input data that can be used to generate a predicted evaluation score for a predictive entity. Examples of evaluation platforms include: (i) a cross-platform evaluation score, (ii) a cross-platform deviation penalty, (iii) an evaluation period count, (iv) an unstable engagement penalty, (v) a stable sentiment bonus, (vi) an entity profile weightage factor, and/or the like. In some embodiments, the predicted evaluation score for a predictive entity is determined based at least in part on the evaluation parameters for the predictive entity if the predictive entity is associated with more than one evaluation periods. For example, in some embodiments, the predictive evaluation score for a predictive entity is determined based at least in part on the evaluation parameters for the predictive entity if the feedback data objects associated with the predictive entity are associated with more than one evaluation periods.

The term "per-platform evaluation score" may refer to a data object that describes a predicted score for a predictive entity (e.g., a social score for a medical provider entity) that is determined based at least in part on feedback data provided by one or more end-users on a particular evaluation platform (e.g., on Google Reviews, on Facebook, and/or the like). In some embodiments, to determine the per-platform evaluation score for a particular predictive entity with respect to the particular evaluation platform, the following steps/operations are performed: (i) one or more engagement attributes are determined for the predictive entity, and (ii) the one or more engagement attributes are processed by an entity evaluation machine learning model (e.g., a feedforward neural network machine learning model) that is associated with the particular evaluation platform in order to generate the per-platform evaluation score for the particular predictive entity with respect to the particular evaluation platform. In some embodiments, determining a per-platform evaluation score comprises: determining one or more periodic per-platform evaluation scores for the per-platform evaluation score with respect to the one or more evaluation periods (e.g., n periodic scores for n years); and determining the per-platform evaluation score based at least in part on (e.g., by averaging or summing) the one or more periodic per-platform evaluation scores.

The term "entity profile weightage factor" may refer to a data object that describes a predicted score for a predictive entity that describes whether/how much the entity feature data associated with the predictive entity correspond to a preferred entity profile. For example, if a preferred entity profile describes women who practice gynecology in Alabama, and if the gender field of the preferred entity profile is associated with a weight of a, the practice area field of the preferred entity profile is associated with a weight of b, and the location field of the preferred entity profile is associated with of c, then a predictive entity that is a man practicing gynecology in Georgia may be associated with an entity profile weightage factor of a+b. In some embodiments, n preferred entity profiles are defined. In some of the noted embodiments, for each preferred entity profile, a separate entity profile weightage factor is generated for the predictive entity with respect to each of the n preferred entity profiles, and then the n entity profile weightage factors are aggregated (e.g., summed up, averaged, and/or the like) to generate a final entity profile weightage factor for the predictive entity. In some embodiments, the entity profile weightage factor is an inferred optimal value/prospective value for modifying (e.g., increasing or decreasing) a predicted evaluation score. The entity profile weightage factor may be a predictive output of a sub-model of an engagement determination machine learning model and may be determined based at least in part on one or more engagement attributes. For example, in some embodiments, the entity profile weightage factor may be based at least in part on predictive entity location data (e.g., current and/or historical location data) and/or provider demographic data (e.g., gender, age, specialty, and/or the like).

The term "stable engagement score" may refer to a data object that describes a predicted score for the predictive entity that describes whether an engagement designation count associated with a predictive entity satisfies an engagement designation count threshold (e.g., engagement designation count threshold of 2). In some embodiments, when the engagement designation count associated with a predictive entity satisfies an engagement designation count threshold, the stable engagement score has a negative value, and when engagement designation count associated with a predictive entity fails to satisfy an engagement designation count threshold, the stable engagement score has a positive value. In some embodiments, an engagement designation count associated with a predictive entity satisfies an engagement designation count threshold when the engagement designation count is more than the engagement designation count threshold. In some embodiments, the engagement designation count describes a count of engagement designations described by predictive entity associated with a predictive entity (e.g., a count of practice institutions that have employed a medical provider entity as determined based at least in part on transactional data associated with the medical provider entity. In some embodiments, the engagement designation count describes a count of engagement designations described by predictive entity associated with a predictive entity (e.g., a count of practice institutions that have employed a medical provider entity as determined based at least in part on transactional data associated with the medical provider entity, where the engagement designations have occurred within the last n temporal units/periods/ evaluation periods (e.g., within the last five years). In some embodiments, when the stable engagement score for a predictive entity is a negative value, then the unstable engagement penalty has a predefined negative value (e.g., a predefined positive value of 10). In some embodiments, when the stable engagement score for a predictive entity is a positive value, then the unstable engagement penalty has a predefined positive value (e.g., a predefined positive value of zero).

The term "predicted stable sentiment score" may refer to a data object that describes an inferred emotional state of a predictive entity (e.g., stable mode or unstable mood) associated during a particular evaluation period. In some embodiments, the predicted stable sentiment score may be determined based at least in part on one or more sentiment values associated with aggregated predictive entity data across one or more evaluation periods. The predicted stable sentiment score may be an output of a sentiment determination machine learning model.

The term "sentiment determination machine learning model" may refer to a data object that describes parameters and/or hyper-parameters of machine learning model configured to perform a plurality of operations with respect to a predictive entity data object (e.g., image/video sensor data and/or audio sensor data) in order to generate a predictive output. The sentiment determination machine learning model may be a sub-model or component of an example engagement determination machine-learning model. In some embodiments, the sentiment determination machine learning model may be or comprise an image processing machine learning model, an audio processing machine learning model, combinations thereof, and/or the like. In some embodiments, an example image processing machine learning model may be configured to process image/video sensor data associated with a predictive entity in order to generate a predicted stable sentiment score. In some embodiments, the image processing machine learning model may utilize facial recognition and machine vision processing techniques to determine the predicted stable sentiment score (e.g., provider mood, disposition, attitude, and/or the like) in real-time or over a predetermined evaluation period. In some embodiments, an example audio processing machine learning model may be configured to process audio data associated with a predictive entity in order to generate the predicted stable sentiment score.

The term "evaluation period" may refer to a data object that describes a time period that is associated with a predictive entity presence on one or more engagement platforms (e.g., social media platforms, mobile platforms, healthcare management systems, and/or the like). An example of an evaluation period is a year. In some embodiments, an evaluation period count describes a number of evaluation periods for which data is available with respect to a predictive entity. In some embodiments, the evaluation period count may relate to a number of years of practice for a predictive entity (e.g., provider entity).

The term "feedback data object" may refer to a data object that describes feedback data (e.g., rating data, natural language feedback data, and/or the like) provided by an end user with respect to a predictive entity. In some embodiments, a feedback data object is provided using an evaluation platform, which may be a software platform (e.g., a web software platform) that enables end-users to provide/submit feedback data with respect to one or more predictive entities. In some embodiments, a feedback data object describes structured data generated based at least in part on natural language feedback data that are inferred via processing the natural language feedback data using a natural language processing machine learning model, such as a transformer-based natural language processing machine learning model. In some embodiments, a current period high-ranked feedback data object describes a count of feedback data objects (e.g., across all evaluation platforms) of a predictive entity within a current evaluation period (e.g., a current year) that describe a threshold feedback score (e.g., that have a rating that exceeds x, where x equals the $80^{th}$ percentile rating provided by all of the feedback data objects pertaining to a predictive entity that are provided during the current evaluation period). In some embodiments, a preceding period high-ranked feedback data object describes a count of feedback data objects (e.g., across all evaluation platforms) of a predictive entity within a preceding evaluation period (e.g., an immediately preceding year) that describe a threshold feedback score (e.g., that have a rating that exceeds x, where x equals the $80^{th}$ percentile rating provided by all of the feedback data objects pertaining to a predictive entity that are provided during the preceding evaluation period).

The term "non-recurring feedback ratio" may refer to a data object that describes a ratio of feedback data objects (e.g., across all evaluation platforms) for a corresponding evaluation period (e.g., for a corresponding year) that are either: (i) by those feedback-providing user profiles that have not previously provided feedback data objects with respect to a target predictive entity, and/or (ii) if the target predictive entity is determined to be a general practitioner predictive entity (e.g., a general physician), by those feedback-providing user profiles that have not previously provided feedback data objects with respect to the target predictive entity during a threshold time period (e.g., during the last year) and who are not determined to be related to (e.g., determined to be family members of) any feedback-providing user profiles that have previously provided feedback data objects with respect to the target predictive entity during the threshold time period. In some embodiments, the non-recurring feedback ratio for a corresponding year describes a ratio of feedback data objects provided during the year and for a particular medical provider entity that are either by those feedback-providing user profiles that have not previously provided feedback data objects with respect to the medical provider entity, or by those feedback-providing user profiles that have not previously provided feedback data objects with respect to the medical provider entity during the last year and whose are not family members of any feedback-providing user profiles that have previously provided feedback data objects with respect to the medical provider entity during the previous year, if the medical provider entity is a general physician entity. In some embodiments, if a particular year is associated with x feedback data objects for a general physician medical provider data entity, and if y of those reviews are either by those feedback-providing user profiles that have not previously provided feedback data objects with respect to the medical provider entity, or by those feedback-providing user profiles that have not previously provided feedback data objects with respect to the medical provider entity during the last year and whose are not family members of any feedback-providing user profiles that have previously provided feedback data objects with respect to the medical provider entity during the previous year, then the non-recurring feedback ratio is determined based at least in part on x/y. In some embodiments, if the predictive entity data (e.g., transactional data) associated with a predictive entity is associated with a evaluation periods (e.g., years of practice), and if b of those evaluation periods are associated with non-recurring feedback ratios that satisfy (e.g., fall above) a non-recurring feedback ratio threshold, then, if the predictive entity is associated with only a single evaluation period (e.g., the predictive entity data associated with the predictive entity is associated with the single evaluation period), then the predicted evaluation score for the predictive entity is determined based at least in part on (e.g., based at least in part on a product of) a current period high-ranked feedback count for the predictive entity, a preceding period high-ranked feedback count for the predictive entity, and b.

The term "cross-platform evaluation deviation measure" may refer to a data object that describes a measure of a difference between a smallest per-platform evaluation score for a predictive entity across a current evaluation period (e.g., a current year) and a largest per-platform evaluation score for the predictive entity across the current evaluation period. For example, the cross-platform evaluation deviation measure may describe a ratio of: (i) a difference between a smallest per-platform evaluation score for a predictive entity across a current evaluation period (e.g., a current year) and a largest per-platform evaluation score for the predictive entity across the current evaluation period, and (ii) the smallest per-platform evaluation score. As another example, the cross-platform evaluation deviation measure may describe a ratio of: (i) a difference between a smallest per-platform evaluation score for a predictive entity across a current evaluation period (e.g., a current year) and a largest per-platform evaluation score for the predictive entity across the current evaluation period, and (ii) the largest per-platform evaluation score. In some embodiments, given a predictive entity that is associated with n per-platform evaluation scores across n evaluation platforms for a current evaluation period, the cross-platform evaluation deviation measure for the predictive entity is determined based at least in part on the smallest one and the largest one of the n per-platform evaluation scores.

The term "cross-platform deviation penalty" may refer to a data object that describes whether a cross-platform evaluation deviation measure for a particular predictive entity satisfies (e.g., is above or equal to) a cross-platform evaluation deviation threshold (e.g., a cross-platform evaluation deviation threshold of 10 percent). In some embodiments, if the cross-platform evaluation deviation measure for the particular predictive entity satisfies the cross-platform evaluation deviation threshold, then the cross-platform deviation penalty has a predefined negative value (e.g., a predefined negative value of −20). In some embodiments, if the cross-platform evaluation deviation measure for the particular predictive entity fails to satisfy the cross-platform evaluation deviation threshold, then the cross-platform deviation penalty has a predefined positive value (e.g., a predefined positive value of one).

The term "predictive entity profile" may refer to a data object storing and/or providing access to information/data for a predictive entity. In some embodiments, a provider profile may describe a medical provider. In some embodiments, the predictive entity profile may be associated with a national provider identifier (NPI). In some embodiments, the predictive entity profile describes medical information/data, and/or historical event data for the predictive entity. In some embodiments, a predictive entity is an example of a predictive entity. In some embodiments, a predictive entity is a data object that describes a real-world and/or a virtual entity with respect to which one or more predictive data analysis operations are performed to generate a predicted evaluation score. In some embodiments, all of the steps/operations described herein as being performed with respect to a predictive entity can be performed with respect to any other types of predictive entities. Feature data described by a predictive entity profile are in some embodiments referred to engagement attributes for the corresponding provider entity.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution.

For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example system architecture 100 for performing optimized engagement predictive steps/operations. The architecture 100 includes an optimized engagement prediction system 101 configured to receive data from the client computing entities 102, process the data to generate predictive outputs (e.g., predicted evaluation score data objects/an optimized provider reimbursement model) and provide the outputs to the client computing entities 102 for generating user interface data and/or dynamically updating a user interface. In some embodiments, optimized engagement prediction system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The optimized engagement prediction system 101 may include an optimized engagement prediction computing entity 106 and a storage subsystem 108. The optimized engagement prediction computing entity 106 may be configured to receive queries, requests and/or data from client computing entities 102, process the queries, requests and/or data to generate predictive outputs, and provide (e.g., transmit, send and/or the like) the predictive outputs to the client computing entities 102. The client computing entities 102 may be configured to transmit requests to the optimized engagement prediction computing entity 106 in response to queries. Responsive to receiving the predictive outputs, the client computing entities 102 may generate user interface data and may provide (e.g., transmit, send and/or the like) user interface data for presentation by user computing entities.

The storage subsystem 108 may be configured to store at least a portion of the data utilized by the optimized engagement prediction computing entity 106 to perform optimized engagement predictive steps/operations and tasks. The storage subsystem 108 may be configured to store at least a portion of operational data and/or operational configuration data including operational instructions and parameters utilized by the optimized engagement prediction computing entity 106 to perform optimized engagement predictive steps/operations in response to requests. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Optimized Engagement Prediction Computing Entity

FIG. 2 provides a schematic of an optimized engagement prediction computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the optimized engagement prediction computing entity 106 may also include one or more network interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the optimized engagement prediction computing entity 106 may include or be in communication with one or more processing elements 205 (also referred to as processors, processing circuitry, and/or similar terms used herein interchangeably) that communicate with other elements within the optimized engagement prediction computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the optimized engagement prediction computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the optimized engagement prediction computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the optimized engagement prediction computing entity 106 with the assistance of the processing element 205 and operating system.

As indicated, in one embodiment, the optimized engagement prediction computing entity 106 may also include one or more network interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the optimized engagement prediction computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the optimized engagement prediction computing entity 106 may include or be in communication with one or more input elements, such as a keyboard input, a mouse input, a touch screen/display input, motion input, movement input, audio input, pointing device input, joystick input, keypad input, and/or the like. The optimized engagement prediction computing entity 106 may also include or be in communication with one or more output elements (not shown), such as audio output, video output, screen/display output, motion output, movement output, and/or the like.

Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the optimized engagement prediction computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the optimized engagement prediction computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the target user profile interface may be a user application, browser, user interface, and/or similar words used herein interchangeably executing on and/or accessible via the client computing entity 102 to interact with and/or cause display of information/data from the optimized engagement prediction computing entity 106, as described herein. The target user profile input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the target user profile input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the optimized engagement prediction computing entity 106, and/or various other computing entities.

In another embodiment, the client computing entity 102 may include one or more components or functionality that are the same or similar to those of the optimized engagement prediction computing entity 106, as described herein. As will be recognized, these architectures and descriptions are provided for exemplary purposes only and are not limited to the various embodiments.

V. Exemplary System Operations

As described below, various embodiments of the present invention address technical challenges associated with performing machine learning operations on timeseries/periodic data by introducing a machine learning framework that has a first periodic tier for determining predicted evaluation scores for those predictive entities that are associated with a single evaluation period (e.g., a single year of data) and a second periodic tier for determining predicted evaluation scores for those predictive entities that are associated with multiple evaluation periods. The noted framework addresses the existing shortcomings of machine learning frameworks that operate on timeseries/periodic data with respect to inadequacy of data associated with shorter periods to determine parameters needed to perform comprehensive predictive data analysis with respect to longer periods. In accordance with techniques described herein, predictive entities that are associated with a single evaluation period are isolated and processed using a computationally efficient linear regression model, while predictive entities associated with multiple evaluation periods are subject to a more complex processing performed using a set of evaluation parameters. In this way, the machine learning framework that utilizes periodic tiers is able to more efficiently and effectively perform machine learning operations on time-series/periodic data by introducing a machine learning framework that has a first periodic tier for determining predicted evaluation scores for those predictive entities that are associated with a single evaluation period (e.g., a single year of data) and a second periodic tier for determining predicted evaluation scores for those predictive entities that are associated with multiple evaluation periods.

Moreover, described herein are various techniques for performing optimized engagement predictive steps/operations. Some of the described techniques utilize a particular configuration of units and/or steps/operations. However, a person of ordinary skill in the art will recognize that optimized engagement predictive steps/operations discussed herein may be performed using different combinations than the particular combinations described herein.

By facilitating efficient optimized engagement predictive steps/operations, various embodiments of the present invention improve accuracy of generated optimized engagement predictions. Additionally, performing optimized engagement predictive steps/operations according to the methods disclosed results in more efficient use and storage of data.

As described below, various embodiments of the present invention address technical challenges related to improving accuracy of predictive outputs that are generated with respect to provider entities. For example, as described herein, various embodiments of the present invention facilitate generating an optimized provider reimbursement model for a plurality of provider entities.

Exemplary Optimized Engagement Prediction System

FIG. 4 provides an exemplary optimized engagement prediction system architecture 400. As depicted in FIG. 4, the optimized engagement prediction system 101 is configured to process at least one predictive entity data object 401 in order to generate one or more predictive outputs, including a cross-platform evaluation score 405, that may be used to generate an optimized provider reimbursement model. The storage subsystem 108 may provide, as input to the optimized engagement prediction computing entity 106, the at least one predictive entity data object 401. In some embodiments, the storage subsystem 108 may also provide access to data/information associated with one or more entities/profiles (e.g., a recipient profile and a provider profile). As noted herein, the term predictive entity data object may be or comprise a data object storing and/or providing access to information/data with respect to which one or more predictive outputs may be generated. For example, a predictive entity data object may describe audio data, documents, image/video sensor data describing one or more recorded events, and/or engagement platform data (social media data, mobile platform data, SMAC data, combinations thereof, and/or the like). Additionally, a predictive entity data object may be associated with a predictive entity profile.

Referring now to FIG. 5, an operational example depicting an example process 500 for generating a predictive entity data object and/or a provider demographic database is provided. As depicted in FIG. 5, an optimized engagement prediction system 101 may obtain raw data/information associated with a predictive entity 501. For example, the optimized engagement prediction system 101 may obtain (e.g., receive, request, capture, and/or the like) structured and/or unstructured data from a plurality of sources. In some embodiments, as depicted, the optimized engagement prediction system 101 may obtain engagement platform data 503 (e.g., social media data and/or mobile device data from a social media platform and/or mobile device platform) and utilize such data (e.g. Social Mobile Analytics and Cloud (SMAC) data) to enrich (e.g., augment, enhance, and/or the like) data stored in a database 505 (e.g., provider demographic database).

In some embodiments, optimized engagement prediction system 101 may obtain information/data from a plurality of sources (e.g., a healthcare management system, electronic health record (EHR) system, medical billing system, provider care management system (PCMS), and/or the like). As depicted, the optimized engagement prediction system 101 stores predictive entity data object(s) in a database 505 (e.g., a database (e.g., retrospective predictive entity profile database)) and processes the predictive entity data objects in order to generate predictive outputs and/or data analytics 507 that can be used to generate an optimized provider reimbursement model and/or perform one or more prediction-based actions.

Referring now to FIG. 7A, an operational example 700A depicting generating a database (e.g., retrospective predictive entity profile database) in accordance with some embodiments discussed herein is provided.

As discussed herein, optimized engagement prediction system 101 may aggregate predictive entity data (e.g., retrospective or historical data) from a plurality of different sources/databases, including historical member and provider databases (e.g., a healthcare management system, EHR system, medical billing system, PCMS, and/or the like). As illustrated in FIG. 7A, optimized engagement prediction system 101 obtains and processes provider clinical profile data 701A, provider clinical profile historical data 703A, provider personal profile data 705A, retrospective provider demographic data 707A, provider family profile data 709A, member profile data 711A, and provider professional profile data 713A. In some embodiments, optimized engagement prediction system 101 performs database join operations based at least in part on identifiers (e.g., an NPI, a social security number, and/or the like) in order to correlate data from the plurality of sources. In some embodiments, the predictive entity data may be stored in conjunction with a predictive entity profile.

In some embodiments, optimized engagement prediction system 101 may integrate retrospective provider demographic data with health plan data based at least in part on NPIs and process the data in order to obtain insights into different provider entity sub-populations. For example, optimized engagement prediction system 101 can determine which health care plans are in demand in a particular location (e.g., State), a reimbursement lag for a provider population (e.g., defining a time period between a provider date of service and a provider compensation receipt date), claim settlement ratio (e.g., per-provider, and/or per-state) which may be utilized to identify reasons for high rejection ratios, historical claim settlement trends, provider health plan participation rates, correlations between a low claim settlement ratio and an increase in non-participation of providers (e.g., on a per-state, per-healthcare plan, and/or per-disease basis).

Referring now to FIG. 7B, an operational example 700B depicting generating predictive entity profile data in accordance with some embodiments discussed herein is provided.

As noted herein, optimized engagement prediction system 101 may aggregate predictive entity data from a plurality of sources/databases, including historical member and provider databases (e.g., a healthcare management system, EHR system, medical billing system, PCMS, and/or the like). As depicted in FIG. 7B, optimized engagement prediction system 101 obtains and processes provider services data 701B, historical claim data 703B, provider payer call data 705B, claim settlement data 707B, claim reimbursement lag data 709B, claim verification data 711B, member health plan data 713B and claim settlement percentage and denial data 715B. In some embodiments, optimized engagement prediction system 101 performs database join operations based at least in part on identifiers (e.g., claim identifier, member identifier, and/or the like) in order to correlate data from the plurality of sources. In some embodiments, the predictive entity data may be stored in conjunction with a predictive entity profile.

Returning to FIG. 4, in various embodiments, the optimized engagement prediction system 101 may comprise an engagement determination machine learning model that is configured to generate one or more predictive outputs. For example, an engagement determination machine learning model may be a data object describing steps/operations, hyper-parameters, and/or parameters of a machine learning model that is configured to determine a predicted evaluation score with respect to a predictive entity. The steps/operations of the engagement determination machine learning model may lead to generating an optimized provider reimbursement model and/or performing one or more prediction-based actions. In some embodiments, the engagement determination machine learning model may a convolutional deep neural network machine learning model, a CNN model, an RNN, and/or the like.

As depicted in FIG. 4, the optimized engagement prediction system 101 comprises a first engagement determination machine learning model sub-model 403 that is configured to process the predictive entity data object 401 in order to generate a cross-platform evaluation score 405. Additionally, as depicted, the optimized engagement prediction system 101 comprises a second engagement determination machine learning model sub-model 407 that is configured to process the predictive entity data object 401 in order to generate an entity profile weightage factor 409. As further depicted, the optimized engagement prediction system 101 comprises a third engagement determination machine learning model sub-model 411 that is configured to process the predictive entity data object 401 in order to determine a predicted stable sentiment score 413. Once generated, each of the cross-platform evaluation score 405, the entity profile weightage factor 409, and the predicted stable sentiment score 413 can be used to generate a predicted socially weighted effective engagement measure 415 associated with the predictive entity data object 401. The predicted socially weighted effective engagement measure 415 can be used to generate an optimized provider reimbursement model and perform one or more prediction-based actions based at least in part on the optimized provider reimbursement model, as further described below.

Referring now to FIG. 6, a flowchart diagram illustrating an example process 600 for generating an optimized provider reimbursement model which can be used to perform one or more prediction-based actions in accordance with some embodiments discussed herein.

Beginning at step/operation 602, optimized engagement prediction system 101 determines, using an engagement determination machine learning model, one or more engagement attributes, as further discussed below in connection with FIG. 8.

Subsequent to step/operation 602, the example process 600 proceeds to step/operation 604. At step/operation 604, optimized engagement prediction system 101 determines, based at least in part on the or more engagement attributes, a predicted evaluation score for each of a plurality of provider entities. As discussed herein, the term predicted evaluation score may refer to a value describing an inferred determination relating to engagement effectiveness of a predictive entity with respect to other entities (e.g., recipient entities, and/or other entities including family members and friends). The predicted evaluation score may be an output of an engagement determination machine learning model and may be determined based at least in part on a cross-platform evaluation score, an entity profile weightage factor, and/or a stable sentiment score. In some embodiments, an example predicted evaluation score may be determined based at least in part on the following equation, as discussed in more detail below:

$$P=(S*M)+0.1n-U+B+D$$

In the above equation:
  P is a predicted evaluation score;
  S is a cross-platform evaluation score;
  M is a cross-platform deviation penalty;
  n is an evaluation period count;
  U is an unstable engagement penalty;
  B is a stable engagement score; and
  D is an entity profile weightage factor.

As noted above, in some embodiments, optimized engagement prediction system 101 determines the socially-weighted effective engagement measure based at least in part on a cross-platform evaluation score. In some embodiments, the cross-platform evaluation score may be an inferred optimal value/prospective value for modifying (e.g., extending or reducing) a predicted evaluation score that can be determined based at least in part on an evaluation period (e.g., a time period associated with a predictive entity's engagement/presence on one or more engagement platforms). Additionally, the cross-platform evaluation score 405 may be determined based at least in part on socially enriched provider demographic data, including one or more recipient reviews and/or social media-related reviews (e.g., responses to one or more posed questions associated with traits such as knowledgeability, helpfulness, punctuality, behavior, and/or the like). For example, a recipient review may include a combination of knowledge-related questions (e.g., (i) do you think your provider was knowledgeable enough to understand your problem, and (ii) do you think this visit to the provider was helpful in getting your problem resolved) and behavior-related questions (e.g., (i) was the provider available at the clinic on time, and (ii) were you able to see your provider at the appointed time).

In some embodiments, the predicted evaluation score may be determined based at least in part on a cross-platform evaluation score (e.g., associated with a single engagement platform). An example cross-platform evaluation score may be determined using the following equation:

$$S=(R_1-R_2)*N$$

In the above equation:
  S is a cross-platform evaluation score;
  $R_1$ is a count of feedback data objects (e.g., reviews) with an above-threshold score within a current time period;
  $R_2$ is a count of feedback data objects (e.g., reviews) with an above-threshold score within a previous time period; and N is an evaluation period beginning with the previous time period and ending with the current time period.

By way of example, a provider with 1 year of practice may receive 57 above-threshold reviews/77 total reviews from a first engagement platform, and 45 above-threshold reviews/47 total reviews from a second engagement platform. Therefore, a first per-platform engagement score may be 57/77 or 71%, and a second per-platform engagement score may be 96%. Accordingly, in some embodiments, a cross-platform evaluation score may be determined based at least in part on the first per-platform engagement score and the second per-platform engagement score. In the above example, if a cross-platform deviation measure fails to satisfy a cross-platform deviation threshold, the optimized engagement prediction system 101 applies a cross-platform deviation penalty optimized engagement prediction cross-platform deviation may trigger one or more steps/operations in order to refine the predictive output. For example, optimized engagement prediction system 101 may apply only the higher per-platform engagement score (e.g., 96%) in order to reduce system bias, and/or may perform additional analysis on at least a portion of the reviews. In another example, optimized engagement prediction system 101 may determine a predicted evaluation score based at least in part on an average of a top "n" number of per-platform engagement scores associated with a plurality of engagement platforms assessed over one or more evaluation. By way of example, during a particular time period (e.g., a quarter) a provider entity with 2 years of practice may receive 21 above-threshold reviews/30 from a first engagement platform, 17 above-threshold reviews/20 from a second engagement platform, and 28 above-threshold reviews/30 from a third engagement platform. In this example, the first per-platform engagement score may be 21/30 or 70%, the second per-platform engagement score may be 17/20 or 85%, and the third engagement platform score may be 28/30 or 93%. In the above example, optimized engagement prediction system 101 may utilize the average of the top 2 social media platform scores (i.e., 85% and 93% for a final output of 89% for the noted engagement period).

As noted above, in some embodiments, optimized engagement prediction system 101 may determine the predicted evaluation score based at least in part on a plurality of cross-platform evaluation scores. For example, optimized engagement prediction system 101 may determine an average of at least two distinct cross-platform evaluation scores fails to satisfy a cross-platform evaluation score threshold (e.g., when a difference between a first per-platform evaluation score and a second per-platform evaluation score over an evaluation period is above 10%). In some embodiments, if a difference between the first per-platform evaluation score and the second per-platform evaluation score per evaluation period count is over 10%, optimized engagement prediction system 101 may apply a cross-platform deviation penalty. In one example, optimized engagement prediction system 101 may account for a total number of active members associated with an engagement platform.

Referring now to FIG. 7C, an operational example 700C depicting generating predictive entity profile data in accordance with some embodiments discussed herein is provided.

As noted herein, optimized engagement prediction system 101 obtains (e.g., receives, requests, captures, and/or the like) structured and/or unstructured data from a plurality of sources. In some embodiments, optimized engagement prediction system 101 may obtain engagement platform data (e.g., social media data and/or mobile device data from a social media platform and/or mobile device platform). As depicted in FIG. 7C, optimized engagement prediction system 101 obtains and processes provider social profile data 701C, provider mobile demographic data 703C, provider open social profile data 705C, socially enriched provider demographic data 707C, twitter API-based data 709C, provider social JavaScript Object Notation (JSON) data 711C, and web scrapping social data 713C. In some embodiments, optimized engagement prediction system 101 performs database join operations based at least in part on identifiers (e.g., internal provider identifier, email address, phone number, and/or the like) in order to correlate data from the plurality of sources. In some embodiments, the predictive entity data may be stored in conjunction with a predictive entity profile.

Referring now to FIG. 7D, an operational example 700D depicting predictive entity profile data in accordance with some embodiments discussed herein is provided.

As noted herein, in some embodiments, optimized engagement prediction system 101 obtains (e.g., receives, requests, captures, and/or the like) mobile device data from a mobile device platform. As depicted in FIG. 7D, optimized engagement prediction system 101 obtains and processes provider mobile device data 701D, provider mobile assistant data 703D, provider mobile demographic data 705D, and provider mobile operating system data 707D. In some embodiments, optimized engagement prediction system 101 performs database join operations based at least in part on identifiers (e.g., internal provider identifier, email address, phone number, and/or the like) in order to correlate data from a plurality of sources. In some embodiments, the predictive entity data may be stored in conjunction with a predictive entity profile.

As noted above, in some embodiments, optimized engagement prediction system 101 determines the predicted evaluation score based at least in part on an entity profile weightage factor. The term entity profile weightage factor may be an inferred optimal value/prospective value for modifying (e.g., increasing or decreasing) a predicted evaluation score. The entity profile weightage factor may be determined based at least in part on one or more provider demographic attributes/features. The entity profile weightage factor 409 may be based at least in part on predictive entity location data (e.g., current and/or historical location data) and/or demographic data (e.g., gender, age, specialty, and/or the like). For example, optimized engagement prediction system 101 may determine the demographic weightage factor based at least in part on attributes derived from a database (e.g., retrospective predictive entity profile database) and/or provider reimbursement demographic data, as described above in connection with FIG. 7A and FIG. 7B. In some embodiments, optimized engagement prediction system 101 may determine the demographic weightage factor based at least in part on a target demographic attribute associated with a location in order to improve provider participation in a provider health plan. By way of example, Utah may be associated with a low number of female gynecologists. Accordingly, in order to encourage more female gynecologists to enroll in a particular provider health plan in Utah, a high demographic weightage factor (which in turn may be associated with increased reimbursements/ compensation) may be applied to determine the predicted evaluation score for a predictive entity that satisfies engagement attributes associated with a preferred predictive entity (e.g., target demographic attributes, i.e., female gynecologists in Utah). Similarly, Wyoming may be associated with a low number of cardiologists. Thus, in order to encourage cardiologists to enroll in a particular provider health plan in Wyoming, a high demographic weightage factor may be applied to determine the socially-weighted effective engagement measure for a predictive entity that satisfies target demographic attributes, i.e., cardiologists in Wyoming.

As noted above, in some embodiments, optimized engagement prediction system 101 determines the predicted evaluation score based at least in part on a predicted stable sentiment score. In some embodiments, the predicted stable sentiment score may refer to a data object that describes an inferred emotional state of a predictive entity (e.g., stable mode or unstable mood). The predicted stable sentiment score may be an output of a sentiment determination machine learning model, which in turn may be a sub-model of an engagement determination machine learning model. In some embodiments, an example predicted stable sentiment score may indicate predictive entity behavioral patterns (e.g., associated with a particular time of day and/or location). The example sentiment determination machine learning model may be or comprise an image processing machine learning model, an audio processing machine learning model, combinations thereof, and/or the like. In some embodiments, an exemplary image processing machine learning model may be configured to process image/video sensor data associated with a predictive entity in order to generate the predicted stable sentiment score. In some embodiments, an exemplary image processing machine learning model may utilize facial recognition and machine vision processing techniques to determine the stable sentiment score (e.g., provider mood, disposition, attitude, and/or the like) in real-time or over a predetermined evaluation period. The predicted stable sentiment score may comprise a predictive entity's profile across different days and seasons across a time period (e.g., evaluation period). In some embodiments, an example audio processing machine learning model may be configured to process audio data associated with a predictive entity in order to generate the predicted stable sentiment score. Accordingly, optimized engagement prediction system 101 may be configured to identify social and emotional demographic patterns associated with a sub-population of provider entities.

Figure 7E:
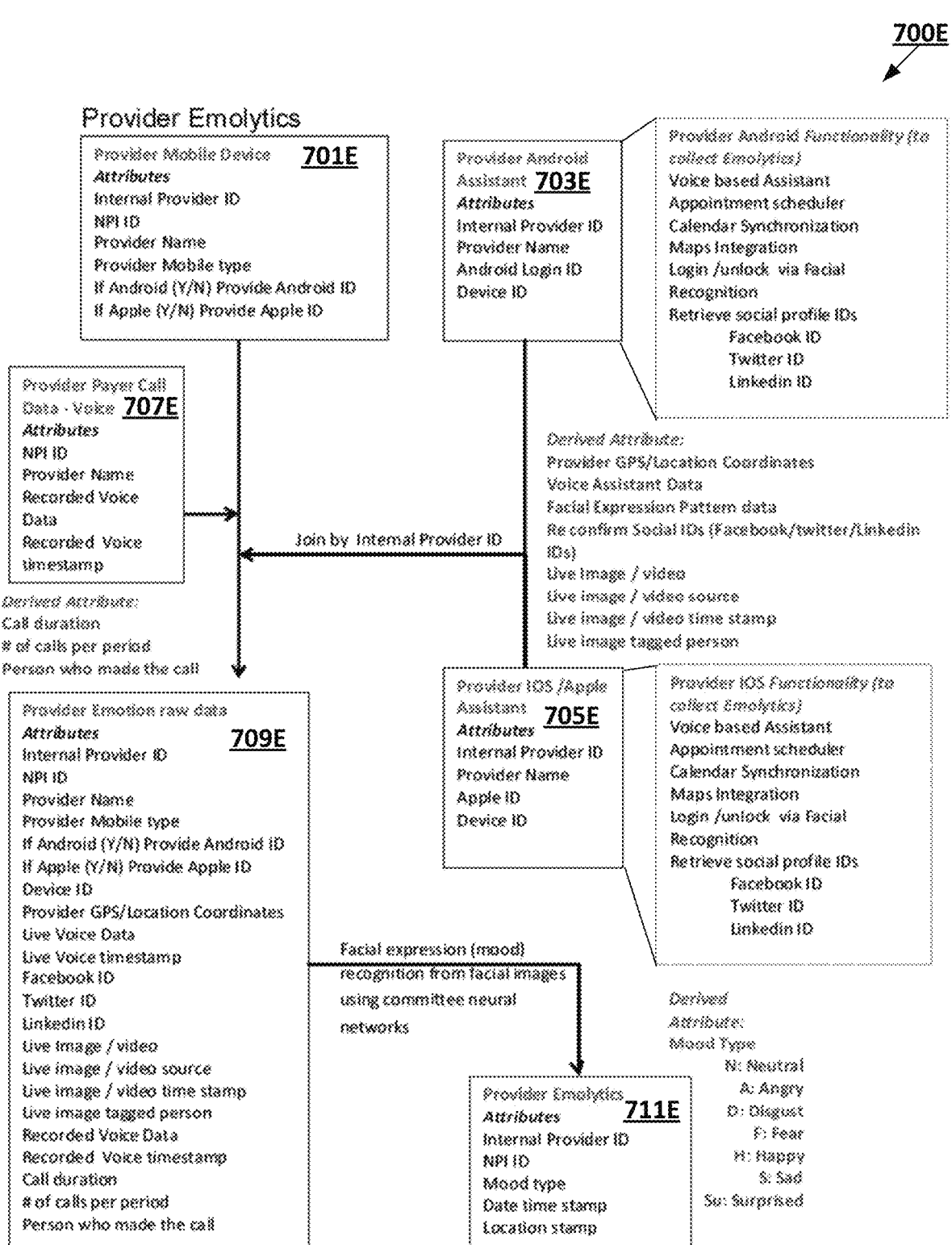

Referring now to FIG. 7E, an operational example 700C depicting generating data associated with a predicted stable sentiment score in accordance with some embodiments discussed herein is provided.

In some embodiments, optimized engagement prediction system 101 obtains (e.g., receives, requests, captures, and/or the like) structured and/or unstructured data (i.e., predictive entity data) from a plurality of sources. As depicted in FIG. 7E, optimized engagement prediction system 101 obtains and processes provider mobile device data 701E, first provider operating system assistant data 703E, second provider operating system assistant data 705E, provider audio data 707E. In various embodiments, optimized engagement prediction system 101 processes the raw provider data 709E, including image/video sensor data, in order to identify one or more provider emotional analytics (emolytics) attributes 711E. In some embodiments, optimized engagement prediction system 101 performs database join operations based at least in part on identifiers (e.g., provider identifier and the like) in order to correlate data from the plurality of sources. In some embodiments, the predictive entity data may be stored in conjunction with a predictive entity profile.

By way of example, optimized engagement prediction system 101 may apply a stable mood bonus to a predictive entity's socially-weighted effective engagement measure in an instance in which the provider's mood during hours of practice at a particular location (e.g., based at least in part on location information obtained from a mobile device) indicate positive facial profiles (e.g., neutral, happy, and/or surprised) and/or is associated with a stable voice emotional profile. In some embodiments, if the predicted stable sentiment score is positive for an above-threshold percentage of time (e.g., 80% of encounters at a location), then optimized engagement prediction system 101 may apply a fixed bonus or multiplier amount to determine the socially-weighted effective engagement measure.

In some embodiments, optimized engagement prediction system 101 may apply an unstable engagement penalty for provider entities that change practices more than a threshold ("n") number of times over a predetermined time period (e.g., more than twice in 5 years). In some embodiments, optimized engagement prediction system 101 may apply a stable engagement score, as further described above. In one example, the unstable engagement penalty may be a negative function of provider entities to an eligible population ratio in a given location divided by the national average for the specialty multiplied by the national average of providers changing practices over the predetermined time period.

As noted above, in some embodiments, optimized engagement prediction system 101 is configured to identify one or more engagement attributes which can be used to generate a predicted socially weighted effective engagement measure.

Referring now to FIG. 8, an operational example depicting an example process 800 for generating one or more provider related attributes is provided.

As depicted in FIG. 8, at step/operation 801, the optimized engagement prediction system 101 obtains raw predictive entity data (e.g., as discussed above in relation to FIG. 7A-FIG. 7E, including application programming interface (API) downloads, web scraping of social media websites). Subsequent to step/operation 801, the example process 800 proceeds to step/operation 803.

At step/operation 803, optimized engagement prediction system 101 performs data processing operations on the raw predictive entity data in order to generate a clean dataset. Subsequent to step/operation 803, the process 800 proceeds to step/operation 805.

At step/operation 805, optimized engagement prediction system 101 performs exploratory data analysis steps/operations on the clean dataset in order to identify potentially impactful engagement attributes. In some embodiments, the exploratory data analysis steps/operations may comprise dimensionality reduction techniques (e.g., multidimensional scaling, principal component analysis (PCA), multilinear PCA, nonlinear dimensionality reduction (NLDR)) to transform the data from a high-dimensional space to a low-dimensional space in order to identify potentially impactful provider demographic data/attributes. In some embodiments, exploratory data analysis steps/operations (e.g., deep learning techniques) may be used to identify potentially impactful provider parameters from different aspects of provider data and propose a hypothesis function showcasing various factors which may lead to provider non-participation (e.g., per-state, per-disease, and/or per-health plan). Optimized engagement prediction system 101 may propose and test various hypotheses/functions to determine whether there is a significant relationship between multiple independent variables/data points (provider demographics) identified using exploratory data analysis steps/operations on a dependent variable (e.g., participation in a health plan). In some embodiments, exploratory data analysis steps/operations may include regression techniques (e.g., linear and/or multiple linear regression techniques) to propose and test a particular hypothesis/function. For example, optimized engagement prediction system 101 may determine that a particular provider sub-group (e.g., Asian ethnicity with teenage children) prefer to establish their practice in a location with highly rated middle schools and high schools. In another example, optimized engagement prediction system 101 may determine that another particular provider sub-group (e.g., Caucasian ethnicity, in the 30-40 year age group) prefer to establish their practice in locations with multiple outdoor sporting facilities. Accordingly, optimized engagement prediction system 101 may facilitate identification and exploration of factors for correlating non-participation after running a series of regression functions on various data points contributing to provider behavior.

Returning now to FIG. 6, subsequent to step/operation 604, the example process 600 proceeds to step/operation 606. At step/operation 606, optimized engagement prediction system 101 generates an optimized provider reimbursement model based at least in part on the plurality of socially-weighted effective engagement measures. As discussed here, the optimized provider reimbursement model may comprise a optimized compensation structure or formula for a plurality of provider entities associated with one or more provider profiles. An exemplary provider categorization table for an optimized provider reimbursement model is provided below:

TABLE 1

| Exemplary Categorization Table for Optimized Provider Reimbursement Model | | | |
|---|---|---|---|
| Category | Evaluation Period Count | Predicted Evaluation Score | Reimbursement Multiplier |
| A | Up to 5 years | Above 80% | ×1.2 |
| B | 5 to 10 years of practice, at least 5 years of service in same State | Above 80% | ×1.3 |
| C | Over 10 years of service in same State | Above 80% | ×1.4 |

Subsequent to step/operation 606, the example process 600 proceeds to step/operation 608. At step/operation 608, optimized engagement prediction system 101 performs one or more prediction-based actions (e.g., based at least in part on the optimized provider reimbursement model). For example, the optimized engagement prediction system 101 may generate one or more predictive outputs and provide (e.g., send, transmit, and/or the like) the outputs to one or more client computing entities 102 for generating user interface data and/or dynamically updating a user interface. Performing Prediction-Based Actions and Generating User Interface Data In various embodiments, optimized engagement prediction system 101 may be configured to respond to queries and/or trigger generation (e.g., by a client computing entity 102) of user interface data (e.g., messages, data objects and/or the like) corresponding with predictive outputs. A client computing entity 102 may provide the user interface data for presentation by a user computing entity. In some embodiments, the user interface data may correspond with an associated workflow and or one or more queues generated for presentation to an end user.

A queue may refer to an ordering of a plurality of data objects describing predictive entities (e.g., provider entities) based at least in part on a portion of the predictive outputs described herein. In some embodiments, optimized engagement prediction system 101 may be configured to generate one or more API-based data objects corresponding with at least a portion of the predictive outputs and/or the one or more queues. The optimized engagement prediction system 101 may provide (e.g., transmit, send) the one or more API-based data objects representing at least a portion of the predictive outputs and/or the one or more queues to an end user interface (e.g., an investigation agent user interface) for display by a display device associated with the end-user interface, and/or for performing other computer-implemented actions. The predictive outputs may be used to dynamically update a user interface, or generate alerts for facilitating actions with respect to a healthcare services inventory (e.g., assigning portions of inventory or data subsets to a plurality of agents, such as an ordered list of provider entities that satisfy at least one criterion). In one example, optimized engagement prediction-based actions include generating an optimized provider reimbursement model in which fee reimbursements are based at least in part on a predicted evaluation score for a predictive entity. For example, providers may be categorized based at least in part on a total number of years of practice and a predicted evaluation score.

In some embodiments, performing the prediction-based actions at step/operation 608 comprises causing display of a prediction output user interface that describes data determined based at least in part on predicted evaluation scores for one or more provider entities.

Other examples of optimized engagement prediction-based actions include generating reports for presentation to an end-user, and generating a training program/schedule in response to issues identified from the data (e.g., recommending training for oncologists in relation to a new chemotherapy drug regimen in a location where a majority of providers are relying on outdated techniques). An example report can provide end users with details on factors and quantifiable figures contributing to provider non-participation in provider health plans, geographical trends, healthcare cost trends, and/or the like.

In some embodiments, the optimized engagement prediction system 101 may be used in conjunction with a healthcare management system that is accessible by insurers and/or providers to recommend a provider health plan to a particular provider or identify one or more providers based at least in part on one or more target attributes.

Referring now to FIG. 9A and FIG. 9B, operational examples of user interfaces 900A and 900B (e.g., dashboards) depicting reports in accordance with some embodiments discussed herein are provided.

The example user interfaces 900A and 900B may be generated based at least in part on information obtained and/or derived from a database (e.g., retrospective predictive entity profile database). In various embodiments, the client computing entity 102 generates user interface data (e.g., one or more data objects) which is provided (e.g., transmitted, sent, and/or the like) for presentation by the user interfaces 900A and 900B of a user computing entity and/or client computing entity 102. The user interfaces 900A and 900B may comprise various features and functionality for accessing, and/or viewing data objects and/or alerts that can support identifying meaningful inferences from the data (e.g., provider delays such as delay on submission of documents or query delays by predictive entity office or insurer delays such as image retrieval delays or incorrect claim coding/classification). For example, the user interfaces 900A and 900B provide a mechanism for accessing information (e.g., reference tables, dashboards, and the like, such as a fee reimbursement dashboard, a provider participation dashboard, and a provider specialty dashboard) that are generated and stored in a database by optimized engagement prediction system 101. The user interfaces 900A and 900B may also present recommendations/solutions for addressing particular issues (e.g., optimal healthcare technology solutions for particular providers/provider health plans, or recommended training to address recurrent issues affecting claim processing).

As depicted in FIG. 9A, the user interface 900A comprises a provider specialty dashboard 901A. The provider specialty dashboard 901A may provide eligible population availability information. As depicted, the provider specialty dashboard 901A includes an indication of State drill down 903A, State and business segment 905A, State, business segment & health plan drill down 907A, reimbursement State drill down 909A, reimbursement State & business segment drill down 911A, and reimbursement State, business segment and health plan drill down 913A. The provider specialty dashboard 901A may provide indications of information specific to a particular location such as eligible population, number of specialists, demographic information (e.g., gender, ethnicity), year of graduation, years of experience, and claim information (e.g., number and value of claims submitted, approved and/or rejected).

As depicted in FIG. 9B, the user interface 900B comprises a provider claim reimbursement dashboard 901B. The provider claim reimbursement dashboard 901B may provide information related to claim processing delays and/or rejections. As depicted, the provider claim reimbursement dashboard 901B includes a business segment drill down 903B, and a State drill down 905B. The provider claim reimbursement dashboard 901B may provide indications of information specific to provider demographic sub-groups at a particular location which may influence recipient quality of care (e.g., ratio of available provider entities to recipient entities).

FIG. 10 provides an operational example of a user interface 1000 that is generated based at least in part on dynamically updating user interface data, where the dynamically updating user interface data may be generated based at least in part on an predicted socially weighted effective engagement measure and/or optimized provider reimbursement model. In various embodiments, the client computing entity 102 generates user interface data (e.g., one or more data objects) which is provided (e.g., transmitted, sent and/or the like) for presentation by the user interface 1000 of a user computing entity and/or client computing entity 102. The user interface 1000 may comprise various features and functionality for accessing, and/or viewing data objects and/or alerts. The user interface 1000 may also comprise messages in the form of banners, headers, notifications, and/or the like.

As illustrated in FIG. 10, an example user interface 1000 may receive user interface data for presentation based at least in part on an predicted socially weighted effective engagement measure and/or optimized provider reimbursement model. As shown, the user interface data comprises an indication of a search criteria 1001 and an indication of search results including provider information 1003, demographic information 1005, and claim/health plan information 1007 associated with a predictive entity. As depicted, the claim/health plan information 1007 includes a claim settlement percentage, claim denial rate, number of patient encounters, overall provider score/average score, a current health plan, and a recommended health plan.

Thus, as described above, various embodiments of the present invention address technical challenges related to improving accuracy of predictive outputs based at least in part by using engagement determination machine learning frameworks. For example, as described herein, various embodiments of the present invention enable optimized compensation determinations that intelligently incorporate data analytics to increase accuracy of predictive outputs.

Various embodiments of the present invention disclose techniques for performing database management operations. By facilitating efficient and accurate processing of various data types from a plurality of sources, while filtering out irrelevant and inapplicable data, the noted embodiments of the present invention improve database management operations and improve the accuracy of predictive outputs associated with such database management operations. This in turn increases the efficiency and reliability of data retrieval operations and/or data query processing operations across various data storage systems, such as various data storage systems that act as a server devices in client-server data storage architectures. The inventors have confirmed, via experiments and theoretical calculations, that various embodiments of the disclosed techniques improve efficiency and accuracy of database management relative to various state-of-the-art solutions.

Furthermore, consolidating and intelligently analyzing data from a plurality of sources facilitates more efficient storage of such data, for example by eliminating data redundancy and duplication across various databases and/or across various database tables. This in turn reduces storage needs of various existing data storage systems. Accordingly, by utilizing some or all of the innovative techniques disclosed herein for performing database management, various embodiments of the present invention increase efficiency and accuracy of data storage operations, data retrieval operations, and/or query processing operations across various data storage systems, such as various data storage systems that are part of client-server data storage architectures. In doing so, various embodiments of the present invention make substantial technical contributions to the field of database systems and substantially improve state-of-the-art data storage systems.

Accordingly, as described above, various embodiments of the present invention address technical challenges associated with performing machine learning operations on timeseries/periodic data by introducing a machine learning framework that has a first periodic tier for determining predicted evaluation scores for those predictive entities that are associated with a single evaluation period (e.g., a single year of data) and a second periodic tier for determining predicted evaluation scores for those predictive entities that are associated with multiple evaluation periods. The noted framework addresses the existing shortcomings of machine learning frameworks that operate on timeseries/periodic data with respect to inadequacy of data associated with shorter periods to determine parameters needed to perform comprehensive predictive data analysis with respect to longer periods. In accordance with techniques described herein, predictive entities that are associated with a single evaluation period are isolated and processed using a computationally efficient linear regression model, while predictive entities associated with multiple evaluation periods are subject to a more complex processing performed using a set of evaluation parameters. In this way, the machine learning framework that utilizes periodic tiers is able to more efficiently and effectively perform machine learning operations on timeseries/periodic data by introducing a machine learning framework that has a first periodic tier for determining predicted evaluation scores for those predictive entities that are associated with a single evaluation period (e.g., a single year of data) and a second periodic tier for determining predicted evaluation scores for those predictive entities that are associated with multiple evaluation periods.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:

receiving, by one or more processors, aggregated predictive entity data for a predictive entity, wherein the aggregated predictive entity data corresponds to an evaluation period count that describes a number of one or more evaluation periods for which the aggregated predictive entity data is available with respect to the predictive entity and the aggregated predictive entity data is scraped from a first engagement platform and a second engagement platform;

generating, by the one or more processors, a set of engagement attributes for the predictive entity based at least in part on the aggregated predictive entity data associated with the predictive entity, wherein:

(i) the set of engagement attributes comprise a cross-platform evaluation score, a cross-platform deviation penalty, and the evaluation period count, (ii) the cross-platform evaluation score is generated by:

(a) determining, based at least in part on the evaluation period count, a first per-platform evaluation score for the predictive entity with respect to an evaluation period of the one or more evaluation periods and the first engagement platform, (b) determining, based at least on part on the evaluation period count, a second per-platform evaluation score for the predictive entity with respect to the evaluation period and the second engagement platform, (c) determining a cross-platform evaluation deviation measure for the predictive entity based at least in part on the first per-platform evaluation score and the second per-platform evaluation score, and (d) generating the cross-platform evaluation score based at least in part on the cross-platform evaluation deviation measure; and (iii) the cross-platform deviation penalty is generated based at least in part on whether the cross-platform evaluation deviation measure and a cross-platform deviation threshold;

generating based at least in part on the set of engagement attributes, a predicted evaluation score, wherein the predicted evaluation score comprises a selection of one of the first per-platform evaluation score or the second per-platform evaluation score in response to the cross-platform evaluation deviation measure meeting or exceeding a deviation threshold; and updating, by the one or more processors and based at least in part on the predicted evaluation score, a position of the predictive entity within a set of search results rendered within a user interface.

2. The computer-implemented method of claim 1, further comprising:

determining one or more periodic per-platform evaluation scores for the first per-platform evaluation score with respect to the one or more evaluation periods; and determining the first per-platform evaluation score based at least in part on the one or more periodic per-platform evaluation scores.

3. The computer-implemented method of claim 1, wherein:

the set of engagement attributes comprises an unstable engagement penalty that is determined based at least in part on whether a stable engagement score for the aggregated predictive entity data fails to satisfy a stable engagement score threshold; and the stable engagement score is determined based at least in part on an engagement designation count of engagement designations associated with the aggregated predictive entity data.

4. The computer-implemented method of claim 1, wherein:

the set of engagement attributes comprises a stable sentiment bonus that is determined based at least in part on whether a stable sentiment score for the aggregated predictive entity data fails to satisfy a stable sentiment score threshold; and the stable sentiment score is determined based at least in part on one or more sentiment values associated with the aggregated predictive entity data across one or more evaluation periods.

5. The computer-implemented method of claim 1, wherein:

the set of engagement attributes comprises an entity profile weightage factor that describes an inferred degree of correspondence between one or more entity attributes for the predictive entity and a preferred entity profile.

6. The computer-implemented method of claim 1, further comprising:

in response to determining that the predictive entity is associated with a single evaluation period, determining the predicted evaluation score based at least in part on a current period high-ranked feedback count for the predictive entity and a preceding period high-ranked feedback count for the predictive entity.

7. A system comprising:

one or more processors; and one or more memories storing processor-executable instructions that, when executed by the one or more processors, cause the one or more processors to perform operations comprising:

receiving aggregated predictive entity data for a predictive entity, wherein the aggregated predictive entity data corresponds to an evaluation period count that describes a number of one or more evaluation periods for which the aggregated predictive entity data is available with respect to the predictive entity and the aggregated predictive entity data is scraped from a first engagement platform and a second engagement platform;

generating a set of engagement attributes for the predictive entity and based at least in part on the aggregated predictive entity data associated with the predictive entity, wherein:

(i) the set of engagement attributes comprises a cross-platform evaluation score, a cross-platform deviation penalty, and the evaluation period count, (ii) the cross-platform evaluation score is generated by:

(a) determining, based at least in part on the evaluation period count, a first per-platform evaluation score for the predictive entity with respect to an evaluation period of the one or more evaluation periods and the first engagement platform, (b) determining, based at least in part on the evaluation period count, a second per-platform evaluation score for the predictive entity with respect to the evaluation period and the second engagement platform, (c) determining a cross-platform evaluation deviation measure for the predictive entity based at least in part on the first per-platform evaluation score and the second per-platform evaluation score, and (d) generating the cross-platform evaluation score based at least in part on the cross-platform evaluation deviation measure; and (iii) the cross-platform deviation penalty is generated based at least in part on the cross-platform evaluation deviation measure and a cross-platform deviation threshold;

generating, based at least in part on the set of evaluation attributes, a predicted evaluation score, wherein the predicted evaluation score comprises a selection of one of the first per-platform evaluation score or the second per-platform evaluation score in response to the cross-platform evaluation deviation measure meeting or exceeding a deviation threshold; and updating based at least in part on the predicted evaluation score, a position of the predictive entity within a set of search results rendered within a user interface.

8. The system of claim 7, wherein the operations further comprise:

determining one or more periodic per-platform evaluation scores for the first per-platform evaluation score with respect to the one or more evaluation periods; and determining the first per-platform evaluation score based at least in part on the one or more periodic per-platform evaluation scores.

9. The system of claim 7, wherein:

the set of engagement attributes comprises an unstable engagement penalty that is determined based at least in part on whether a stable engagement score for the aggregated predictive entity data fails to satisfy a stable engagement score threshold; and the stable engagement score is determined based at least in part on an engagement designation count of engagement designations associated with the aggregated predictive entity data.

10. The system of claim 7, wherein:

the set of engagement attributes comprises a stable sentiment bonus that is determined based at least in part on whether a stable sentiment score for the aggregated predictive entity data fails to satisfy a stable sentiment score threshold; and the stable sentiment score is determined based at least in part on one or more sentiment values associated with the aggregated predictive entity data across one or more evaluation periods.

11. The system of claim 7, wherein:

the set of engagement attributes comprises an entity profile weightage factor that describes an inferred degree of correspondence between one or more entity attributes for the predictive entity and a preferred entity profile.

12. The system of claim 7, further comprising:

in response to determining that the predictive entity is associated with a single evaluation period, determining the predicted evaluation score based at least in part on a current period high-ranked feedback count for the predictive entity and a preceding period high-ranked feedback count for the predictive entity.

13. One or more non-transitory computer-readable media storing processor-executable instructions that, when executed by one or more processors, cause the one or more processors to perform operations comprising:

receiving aggregated predictive entity data for a predictive entity, wherein the aggregated predictive entity data corresponds to an evaluation period count that describes a number of one or more evaluation periods for which the aggregated predictive entity data is available with respect to the predictive entity and the aggregated predictive entity data is scraped from a first engagement platform and a second engagement platform;

generating a set of engagement attributes for the predictive entity and based at least in part on the aggregated predictive entity data associated with the predictive entity, wherein:

(i) the set of engagement attributes comprise a cross-platform evaluation score, a cross-platform deviation penalty, and the evaluation period count, (ii) the cross-platform evaluation score is generated by:

(a) determining, based at least in part on the evaluation period count, a first per-platform evaluation score for the predictive entity with respect to an evaluation period of the one or more evaluation periods and the first engagement platform, (b) determining, based at least in part on the evaluation period count, a second per-platform evaluation score for the predictive entity with respect to the evaluation period and the second engagement platform, (c) determining a cross-platform evaluation deviation measure for the predictive entity based at least in part on the first per-platform evaluation score and the second per-platform evaluation score, and (d) generating the cross-platform evaluation score based at least in part on the cross-platform evaluation deviation measure; and (iii) the cross-platform deviation penalty is generated based at least in part on the cross-platform evaluation deviation measure and a cross-platform deviation threshold;

generating, based at least in part on the set of evaluation attributes, a predicted evaluation score, wherein the predicted evaluation score comprises a selection of one of the first per-platform evaluation score or the second per-platform evaluation score in response to the cross-platform evaluation deviation measure meeting or exceeding a deviation threshold; and updating based at least in part on the predicted evaluation score, a position of the predictive entity within a set of search results rendered within a user interface.

14. The one or more non-transitory computer-readable media of claim 13, wherein the operations further comprise:

determining one or more periodic per-platform evaluation scores for the first per-platform evaluation score with respect to the one or more evaluation periods; and determining the first per-platform evaluation score based at least in part on the one or more periodic per-platform evaluation scores.

15. The one or more non-transitory computer-readable media of claim 13, wherein:

the set of engagement attributes comprises an unstable engagement penalty that is determined based at least in part on whether a stable engagement score for the aggregated predictive entity data fails to satisfy a stable engagement score threshold; and the stable engagement score is determined based at least in part on an engagement designation count of engagement designations associated with the aggregated predictive entity data.

16. The one or more non-transitory computer-readable media of claim 13, wherein:

the set of engagement attributes comprises a stable sentiment bonus that is determined based at least in part on whether a stable sentiment score for the aggregated predictive entity data fails to satisfy a stable sentiment score threshold; and the stable sentiment score is determined based at least in part on one or more sentiment values associated with the aggregated predictive entity data across one or more evaluation periods.

17. The one or more non-transitory computer-readable media of claim 13, wherein:

the set of engagement attributes comprises an entity profile weightage factor that describes an inferred degree of correspondence between one or more entity attributes for the predictive entity and a preferred entity profile.

* * * * *